United States Patent
Katakura et al.

(10) Patent No.: US 6,381,001 B1
(45) Date of Patent: *Apr. 30, 2002

(54) IMAGE READING APPARATUS, IMAGE RECORDING APPARATUS AND IMAGE PROCESSING DEVICE

(75) Inventors: Kazuhiko Katakura; Yasunobu Sakaguchi; Toshiyuki Inoue; Takashi Yamamoto; Takashi Yoshida; Tatsuya Konagaya; Tomonori Nishio, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,153

(22) Filed: Jun. 14, 1999

(30) Foreign Application Priority Data

Jun. 12, 1998 (JP) .............................. 10-165730

(51) Int. Cl.⁷ .......................... G03B 27/52; G03B 21/54
(52) U.S. Cl. ........................... 355/30; 355/67
(58) Field of Search .............................. 355/67, 35, 30, 355/68, 38, 41, 75; 250/201.2, 341.3; 358/487, 474; 348/96

(56) References Cited

U.S. PATENT DOCUMENTS

| | | | | |
|---|---|---|---|---|
| 4,893,148 A | * | 1/1990 | Sanada et al. | 355/27 |
| 5,335,093 A | * | 8/1994 | Imoto | 358/487 |
| 5,532,488 A | * | 7/1996 | Ishibashi et al. | 250/341.3 |
| 5,933,222 A | * | 8/1999 | Hoshino et al. | 355/75 |
| 6,064,468 A | * | 5/2000 | Sakaguchi | 355/67 |
| 6,078,383 A | * | 6/2000 | Sashida | 355/75 |
| 6,175,406 B1 | * | 1/2001 | Iizuka et al. | 355/75 |

* cited by examiner

Primary Examiner—Russell Adams
Assistant Examiner—Peter B. Kim
(74) Attorney, Agent, or Firm—Sughrue Mion, PLLC

(57) ABSTRACT

Light is irradiated onto a photographic film which is conveyed by a film carrier. A compressor generates cooling air for cooling the photographic film. A guide pipe guides the cooling air generated by the compressor to at least one of a region of the photographic film, onto which the light is irradiated, and a reverse surface of the region. In this way, since the cooling air generated by the compressor is guided to the photographic film, the photographic film can be cooled by the cooling air having large amount of flow, velocity of flow, or the like.

13 Claims, 19 Drawing Sheets

F I G. 2
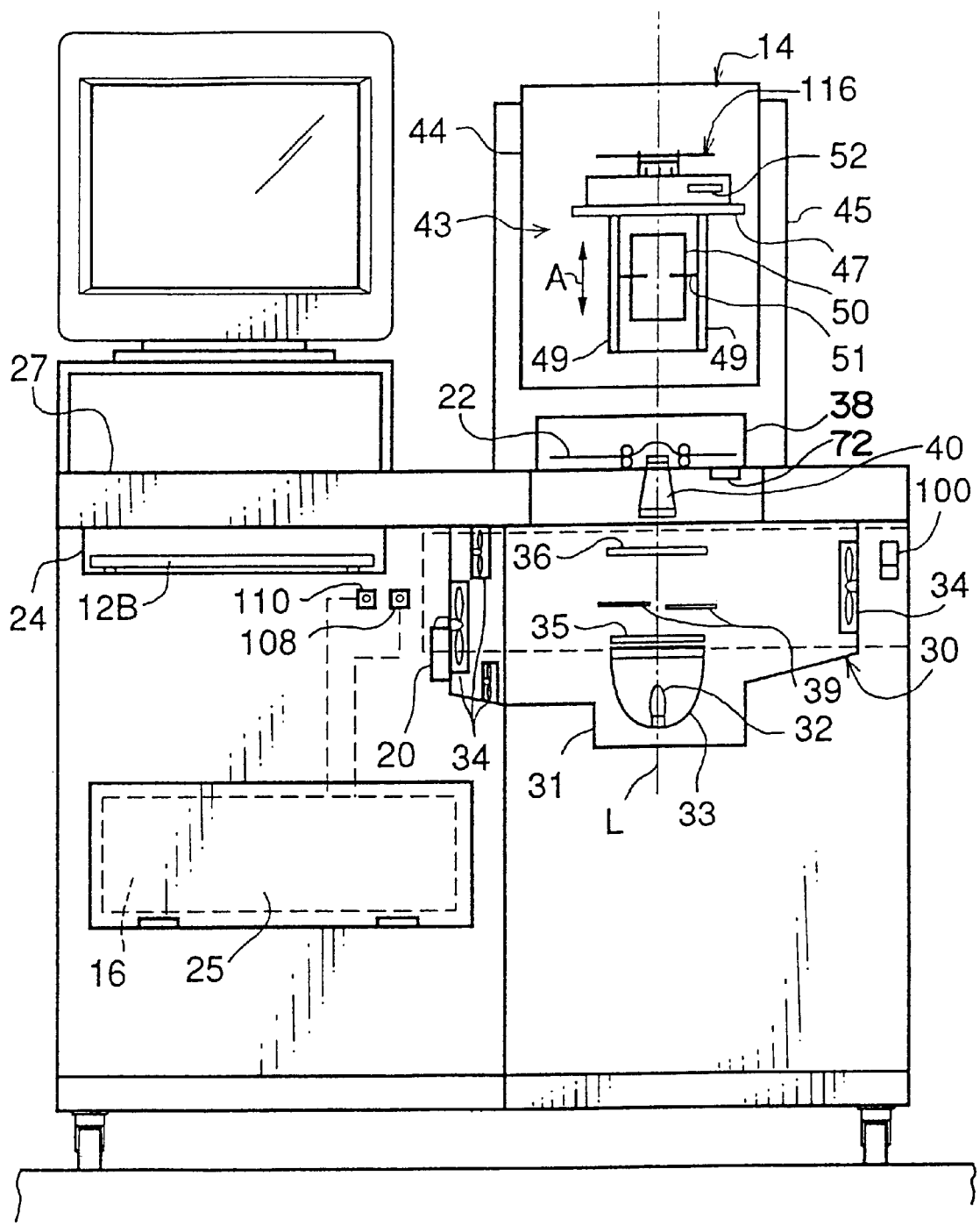

F I G. 5
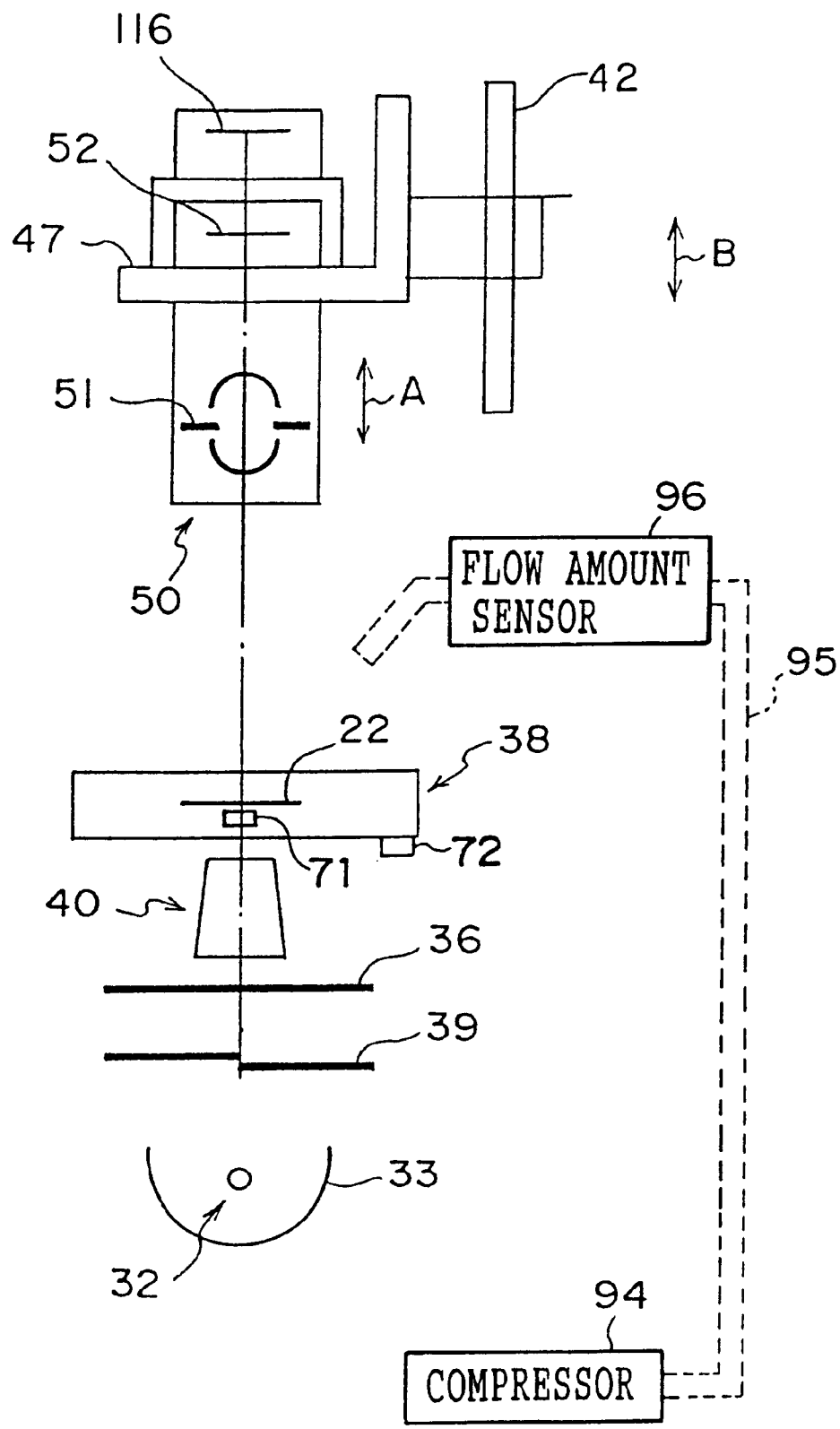

F I G. 6
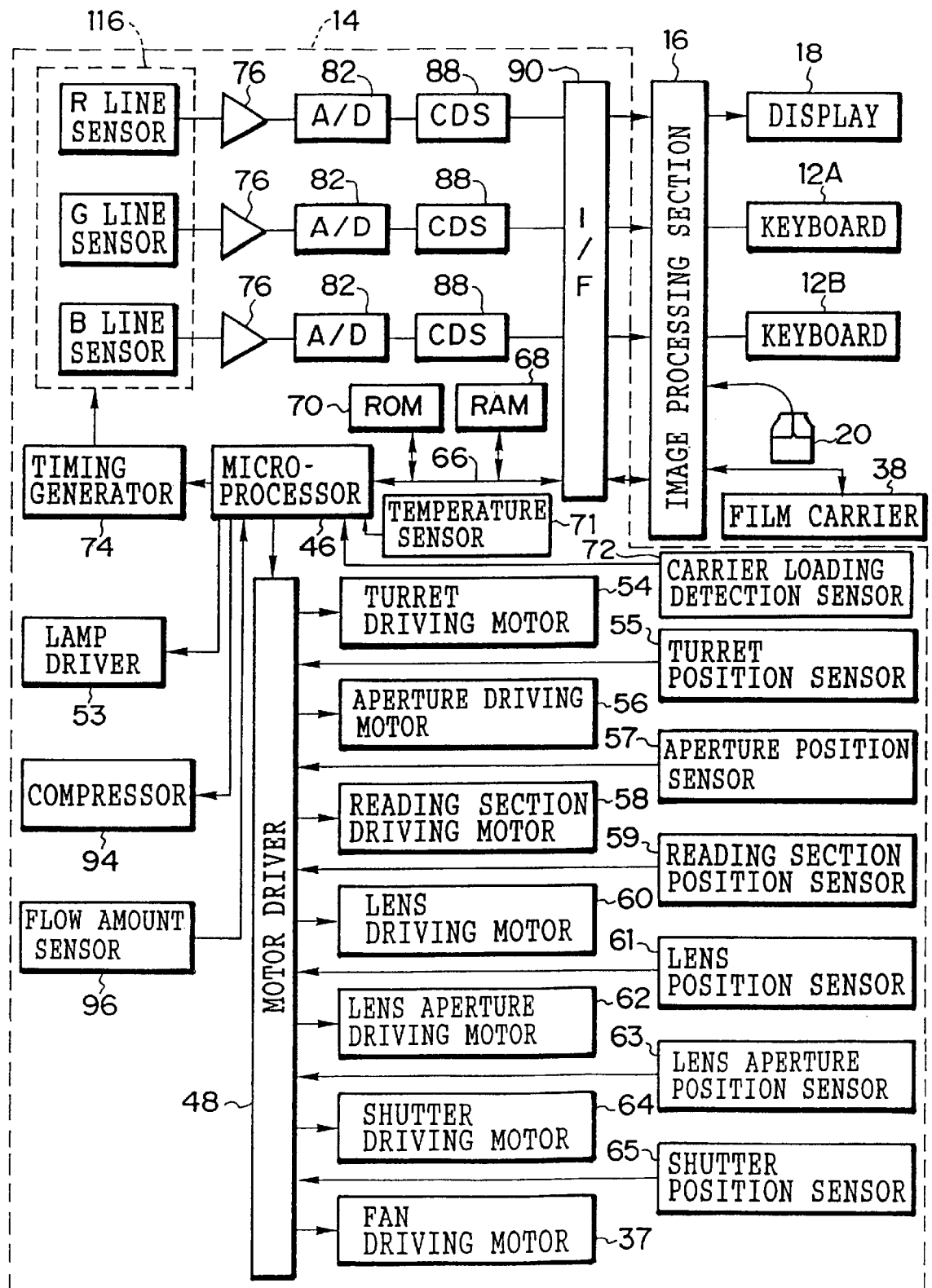

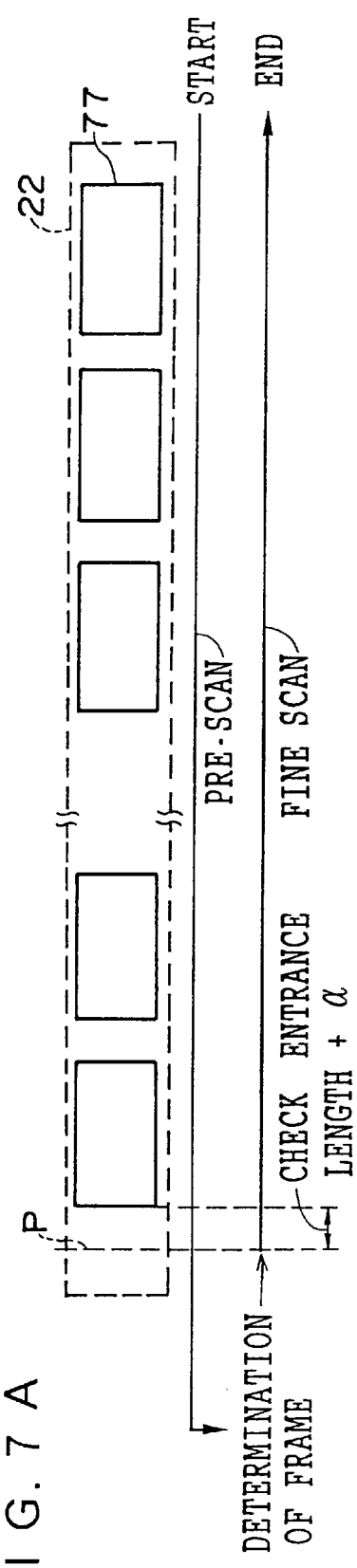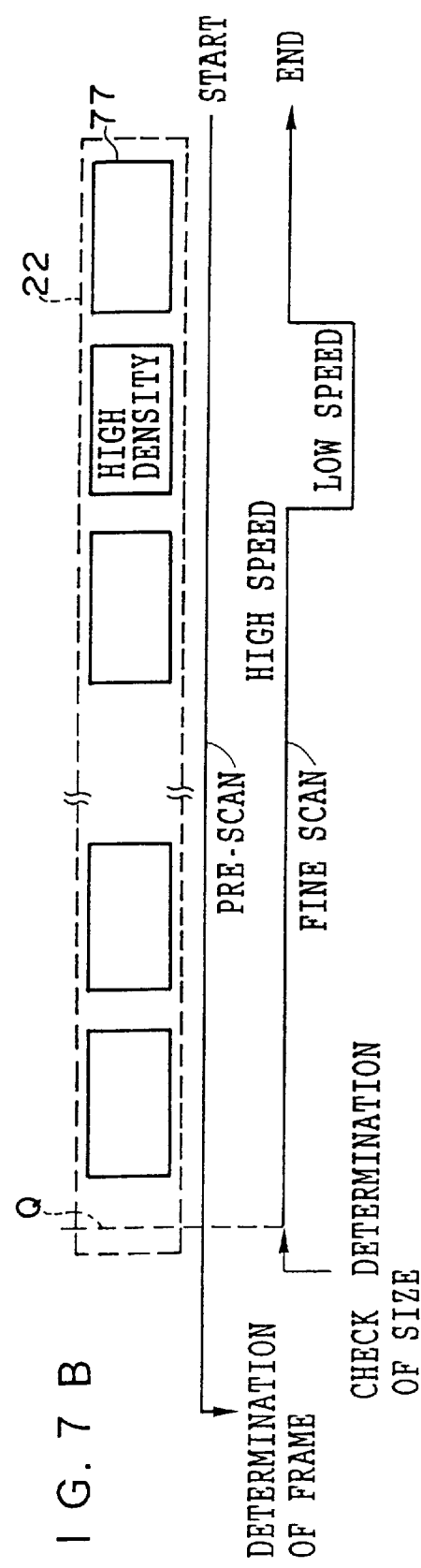

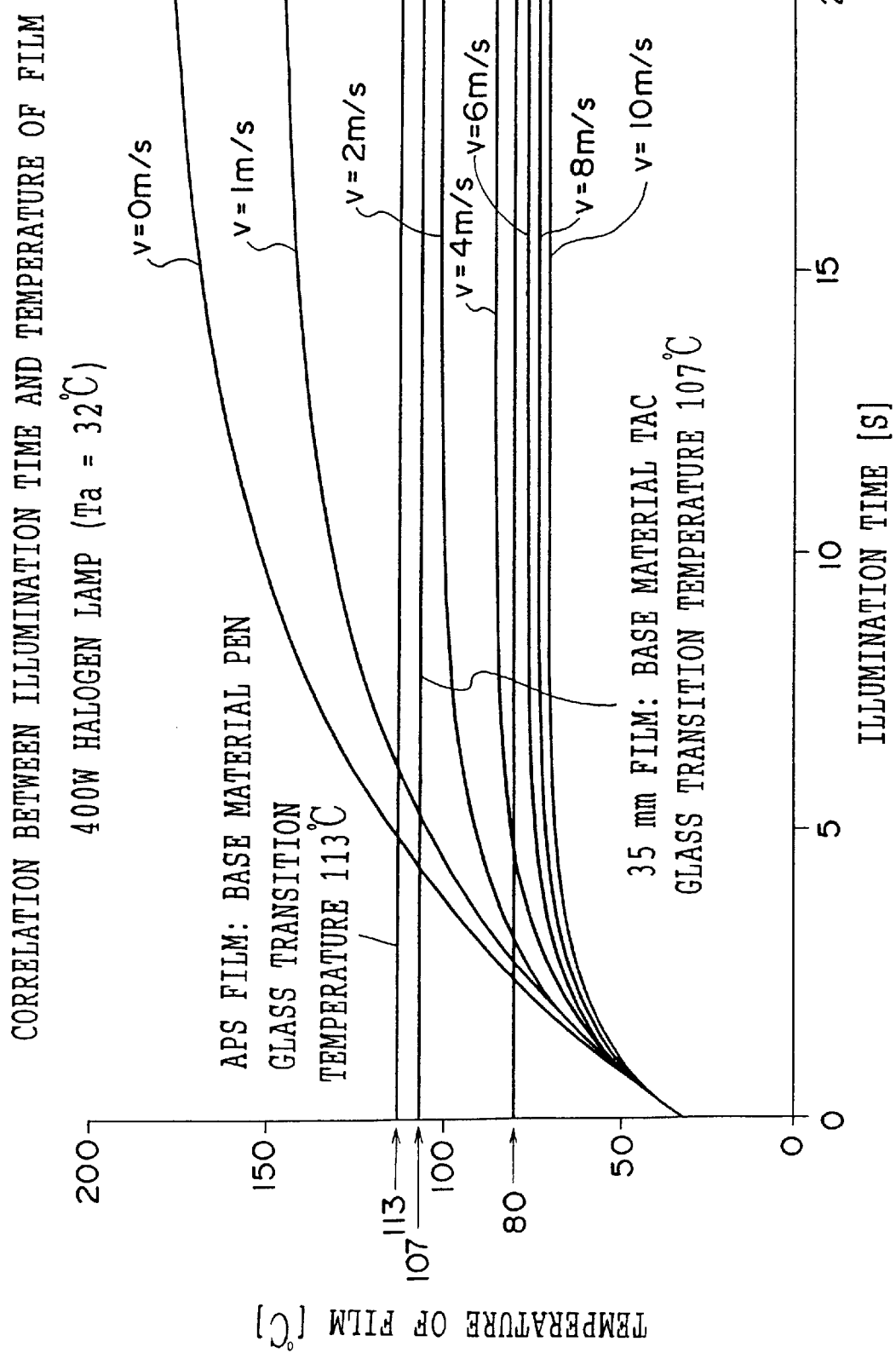

IMAGE READING APPARATUS, IMAGE RECORDING APPARATUS AND IMAGE PROCESSING DEVICE

BACKGROUND OF THE INVENTION

1. Field of the Invention

The present invention relates to an image reading apparatus, and more particularly, to an image reading apparatus in which images recorded onto a photosensitive material are read by reading light from the photosensitive material in a conveyed state. The present invention also relates to an image recording apparatus in which images recorded onto a photosensitive material are recorded onto a photosensitive material for recording by irradiating light from the photosensitive material onto the photosensitive material for recording such as a photographic printing paper or the like in a conveyed state.

2. Description of the Related Art

Recently, a so-called digital photo printer in which images of a photographic film are extracted by a CCD and the extracted images are digitally processed and scan-exposed onto a photographic printing paper has been proposed.

In this digital photo printer, image information recorded onto the photographic film is optically read, the read images are converted into digital signals and subjected to various image processings such that image information for recording is formed. Then, the photosensitive material is scan-exposed by recording light which has been modulated in accordance with this image information. The images (latent images) are recorded and printed in developing processing.

The digital photo printer can freely effect editing such as the composition of a plurality of images, the division of an image, or the like; editing layout of a print image such as editing of characters and an image, or the like; and various image processings such as expansion/contraction, adjustment of color/density/gradation, conversion of negative/positive photographic film, emphasis of outline, or the like. Further, in the conventional direct exposure print, all of the image density information regarding density resolution, space resolution, color/density reproducibility, or the like recorded onto the photographic film cannot be reproduced. However, the digital photo printer can obtain a print in which substantially 100% of image density information recorded onto the photographic film is reproduced.

Further, in the digital photo printer, the image information recorded onto the photographic film or image processing conditions of that information can be recorded (stored) in an external memory or external media such as a memory, a hard disk, or the like provided at the device. Accordingly, when extra printing or the like is carried out, it is not necessary to have a photographic film having original images and to reset processing conditions. Thus, an operation such as the making of extra prints or the like can be carried out rapidly and efficiently. Other services include applied services such as the editing of digital image data recorded by a digital camera or the like and the output of the image to a printer or the like; recording of images of a photographic film onto an external media; transfer of digital image data to a distant place using an internet function; and the like.

A device of this sort is a type of production equipment. Consequently, in this device, it is necessary that images are read in a short time, that so-called processing capacity is high, and that various types of photographic films having a variety of exposure levels are finished with high image qualities. Accordingly, in order to read an input image at a predetermined processing capacity as high quality image data, a larger amount of illuminating light is required for, for example, a negative photographic film which has been overexposed.

Further, in the above-described image reading apparatus, it is known that visible optical components which are required for reading color images also have thermal energy. Consequently, a light source for reading the color image naturally restricts the wavelength region which can be cut and, even if the wavelength components which are not required for reading are cut and light is irradiated, a complete heat insulating effect is not obtained. Thus, when a large amount of light is irradiated, thermal energy accumulates on the photographic film original in proportion to the amount of light, the temperature of the photographic film rises more than a permissible temperature of the photographic film components, and the quality of the photographic film thereby deteriorates. The deterioration of the quality of the photographic film includes temporary deterioration of quality (reversible fading) or permanent deterioration of quality (irreversible fading, deformation of a photographic film base, or the like).

Once irreversible heat damage is inflicted on the photographic film, the film cannot be restored. The function of protecting a photographic film should be one of the most important subjects when the device is constructed. In this case, if the illuminating light is used only for effective illumination, there is the concern that heat damage will be inflicted on the photographic film as described above. Thus, it is necessary to provide any means which prevents rising of the temperature of the photographic film.

SUMMARY OF THE INVENTION

The present invention was developed in light of the above circumstances, and the object thereof is to provide an image reading apparatus and an image recording apparatus which can effectively prevent deterioration of the quality of a photosensitive material.

In order to achieve the above-described object, the present invention comprises: a conveying device which conveys a photosensitive material; an illuminator which irradiates light onto the photosensitive material which is conveyed by the conveying device; a reading device which reads light from the photosensitive material in a state in which the photosensitive material is conveyed by the conveying device; and a cooling device which cools at least one of a region of the photosensitive material onto which the light is irradiated, and a reverse surface of the region.

Namely, the conveying device conveys the photosensitive material and the illuminator irradiates light onto the photosensitive material which is conveyed by the conveying device. The reading device reads light from the photosensitive material in a state in which the photosensitive material is conveyed by the conveying device.

The cooling device cools at least one of the region of the photosensitive material onto which the light is irradiated and the reverse surface of the region.

Thus, when the light from the photosensitive material is read in a conveyed state, because the photosensitive material is cooled even if the amount of light irradiated onto the photosensitive material is increased, deterioration of the quality of the photosensitive material can be prevented.

Namely, the structure which is suitable for the image reading apparatus of the present invention is as follows. Namely, the image reading apparatus of the present invention comprises: a conveying device for conveying a photosensitive material; a CCD having three lines which are disposed in the conveying direction and extend in the direction which intersects the conveying direction for reading an image; a lens device which serves as means of projecting the photosensitive material image onto the CCD; and an illuminator which irradiates light onto the photosensitive material which is conveyed by the conveying device.

Further, the present invention comprises a cooling device which cools at least one of a region of the photosensitive material onto which the light is irradiated and a reverse surface of the region.

In a suitable aspect of the image reading apparatus relating to the present invention, there are a setup equipment which performs image processings on read images and determines the exposure conditions of recorded images, an image processing device which performs various image processings on the read images, and a recording equipment which records (stores) the read images.

Note that even if the above-described 3-line CCD is, e.g., an area sensor or the like, the sensor is, in fact, described as a 3-line CCD if it is used in the same way.

The present invention may further include control means which, when a condition for starting cooling is formed, operates the cooling device and which, when a condition for reducing cooling capacity is formed, reduces (stops or operates at small capacity) the cooling capacity of the cooling device.

Because the cooling device is operated when the condition for starting cooling is formed and the cooling capacity of the cooling device is reduced when the condition for reducing cooling capacity is formed, the cooling device is prevented from operating at large capacity when it is unnecessary, and the life of the cooling device can be lengthened.

The condition for starting cooling may be when the light can be read by the reading device and the condition for reducing cooling capacity may be when the light cannot be read by the reading device. When an image having a predetermined density or higher is recorded onto the photosensitive material, the condition for starting cooling may be when the light from the image having a predetermined density or higher can be read by the reading device and the condition for reducing cooling capacity may be when the light from the image having a predetermined density or lower can be read by the reading device.

The control means may control the cooling device in accordance with the density of the image read by the reading device so that the cooling device operates at larger capacity as the density becomes higher. This is in light of the fact that the temperature of a portion at which the density of the image is high is higher than that of a portion at which the density of the image is low under the same illumination conditions. When the above-described density becomes high, the conveying device is conveyed at slower speed in order to increase the illumination time. In this case, the control means may control the cooling device in accordance with the conveying speed of the conveying device so that the cooling device operates at larger capacity as the conveying speed is slower. This is in light of the fact that, when the conveying speed is slow, the illumination time is long and the temperature of the photosensitive material is high.

Further, the image reading apparatus includes: a detector which detects whether the photosensitive material exists in the region onto which the light is irradiated by the illuminator, wherein the condition for starting cooling may be when it is detected by the detector that the photosensitive material exists in the region, and the condition for reducing cooling capacity may be when it is detected by the detector that the photosensitive material does not exist in the region. When the conveying device can be loaded so as to be attachable and removable, the detector may detect the existence of the photosensitive material in the region by detecting whether the conveying device is loaded. The conveying device is removed and cooling air having a high velocity which is generated by the cooling device can be prevented from blowing against a user or the like.

Moreover, the image reading apparatus includes: an aperture which stops the amount of light irradiated onto the photosensitive material; and a stopped state detector which detects whether a state stopped by the aperture is a dangerous state in which the quality of the photosensitive material is deteriorated by the illumination of the stopped amount of light, wherein the condition for starting cooling may be when it is detected by the stopped state detector that the stopped state is dangerous, and the condition for reducing cooling capacity may be when it is detected by the stopped state detector that the stopped state is not dangerous.

The image reading apparatus further comprises: a sensor which senses a temperature in a vicinity of at least one of the above-described region and the reverse surface of the region, wherein the control means may control the cooling device on the basis of the temperature detected by the sensor so that the quality of at least one of the region and the reverse surface of the region is not deteriorated.

The control means stores in advance a heat resisting temperature (glass transition temperature) so as to not deteriorate the quality of the photosensitive material, and determines whether the temperature detected by the sensor is higher than a temperature which is lower than the heat resisting temperature by a predetermined amount. When the detected temperature is higher than the temperature which is lower than the heat resisting temperature by a predetermined amount, the control means may operate the cooling device.

In accordance with the difference between the above-described heat resisting temperature and the temperature sensed by the sensor, when the difference is large, i.e., when the temperature detected by the sensor is lower than the heat resisting temperature, the control means may control the cooling device so that the cooling device operates at smaller capacity. In this way, when the temperature detected by the sensor is lower than the heat resisting temperature, since the cooling device is operated at smaller capacity, the cooling device can be prevented from operating at an unnecessarily large capacity, and the life of the cooling device can be lengthened.

Because the heat resisting temperature of a base surface of the photosensitive material is lower than that of an emulsion surface thereof, the heat resisting temperature of the base surface is preferably used.

In this way, since the cooling device is controlled on the basis of the temperature in the vicinity of at least one of the region of the photosensitive material, onto which the light is irradiated, and the reverse surface of the region so that the quality of the photosensitive material is not deteriorated, the deterioration of the quality of the photosensitive material can be prevented more reliably.

The cooling device may comprise: a cooling air generating device which generates cooling air for cooling the photosensitive material; and guide means which guides the cooling air generated by the cooling air generating device to at least one of the above-described region and the reverse surface of the region.

The cooling air generating device includes, for example, a compressor, fan, or the like. The amount of flow, the velocity of flow, and the pressure of the cooling air generated by the compressor are larger than those of the cooling air generated by the fan. The larger the amount of flow, the velocity of flow, and the pressure of the cooling air supplied to the photosensitive material, the larger the cooling efficiency. Thus, the cooling air which is generated by the compressor and has larger amount of flow, velocity of flow, and pressure than the cooling air generated by the fan is guided to at least one of the region of the photosensitive material, onto which the light is irradiated, and the reverse surface of the region. Even if the amount of light irradiated onto the photosensitive material is increased, the deterioration of the quality of the photosensitive material can be prevented.

Further, in the present invention, the illuminator irradiates linear light, which extends in the direction intersecting the longitudinal direction of the photosensitive material, onto the photosensitive material, and the cooling device may comprise: a cooling air generating device which generates cooling air for cooling the photosensitive material; and guide means which guides the cooling air generated by the cooling air generating device to at least one of a portion of the region to be illuminated of the photosensitive material, onto which the linear light is irradiated, and the reverse surface of the region to be illuminated.

In this way, since the cooling air generated by the cooling air generating device is guided to at least one of the portion of the region to be illuminated of the photosensitive material, onto which the linear light is irradiated, and the reverse surface of the region to be illuminated, a decrease in the amount of flow of the cooling air can be reduced and the cooling efficiency can be improved.

When the illuminator irradiates linear light, which extends in the direction intersecting the longitudinal direction of the photosensitive material, onto the photosensitive material, the reading device reads the light from the portion of the region of the photosensitive material, onto which the linear light is irradiated.

The guide means guides the cooling air so that the cooling air flows along at least one of the portion of the region to be illuminated and the reverse surface of the region to be illuminated. In this way, the cooling air flows parallel to at least one of the portion of the region to be illuminated and the reverse surface of the region to be illuminated.

Further, the guide means guides the cooling air diagonally over at least one of the entire portion of the region to be illuminated and the reverse surface of the region to be illuminated. In this way, the cooling air blows simultaneously to at least one of the entire portion of the region to be illuminated and the reverse surface of the region to be illuminated. Thus, because at least one of the entire portion of the region to be illuminated and the reverse surface of the region to be illuminated can be cooled without irregularities, the cooling efficiency is higher than the case in which the cooling air flows in parallel.

The cooling air generated by the above cooling air generating device is usually generated by cooling the air. However, since dust or the like is contained in the air, when the cooling air is generated in a usual state, the dust or the like can be included in the cooling air.

Further, when the cooling air generating device is a compressor, resin powders may be generated due to the wear of the interior of the compressor. In this case, the cooling air blown from the compressor can include the resin powders.

In this way, when the photosensitive material is cooled by cooling air containing dust, resin powders, or the like, the dust or the like may adhere to the photosensitive material. As a result, the quality of read images may deteriorate or the photosensitive material may be damaged.

In light of this, the cooling air generating device is preferably provided with an air filter. Further, when the cooling air generating device is a compressor, the air filter is preferably provided at at least one of a suction port or a discharge port of the compressor.

Further, in order to achieve the above object, an image recording apparatus relating to the present invention comprises: a conveying device which conveys a photosensitive material; an illuminator which irradiates light onto the photosensitive material conveyed by the conveying device; guide means which guides light from the photosensitive material so that the light from the photosensitive material is irradiated onto a photosensitive material for recording in a state in which the photosensitive material is conveyed by the conveying device; and a cooling device which cools at least one of a region of the photosensitive material, onto which the light is irradiated, and a reverse surface of the region.

Namely, the conveying device conveys the photosensitive material and the illuminator irradiates light onto the photosensitive material conveyed by the conveying device. The guide means guides the light from the photosensitive material so that the light from the photosensitive material is irradiated onto the photosensitive material for recording in the state in which the photosensitive material is conveyed by the conveying device.

The cooling device cools at least one of the region of the photosensitive material, onto which the light is irradiated, and the reverse surface of the region.

Accordingly, in the image recording apparatus relating to the present invention as well, even if the amount of light irradiated onto the photosensitive material is increased when the light from the photosensitive material is irradiated onto the photosensitive material for recording in the conveyed state, since the photosensitive material is cooled, deterioration of the quality of the photosensitive material can be prevented.

BRIEF DESCRIPTION OF THE DRAWINGS

FIG. 2 is a front cross-sectional view of an optical system of the line CCD scanner.

FIG. 5 is a plan view which shows only a principal portion of the optical system of the line CCD scanner.

FIG. 6 is a block diagram which shows a schematic structure of an electric system of the line CCD scanner.

FIGS. 7A and 7B are conceptual views which show the states of pre-scan and fine scan.

FIG. 8 is a graph which shows a relationship between the illumination time and the temperature of the photographic film.

DESCRIPTION OF THE PREFERRED EMBODIMENTS

An embodiment of the present invention will be described in detail hereinafter with reference to the drawings.

Figure 1:
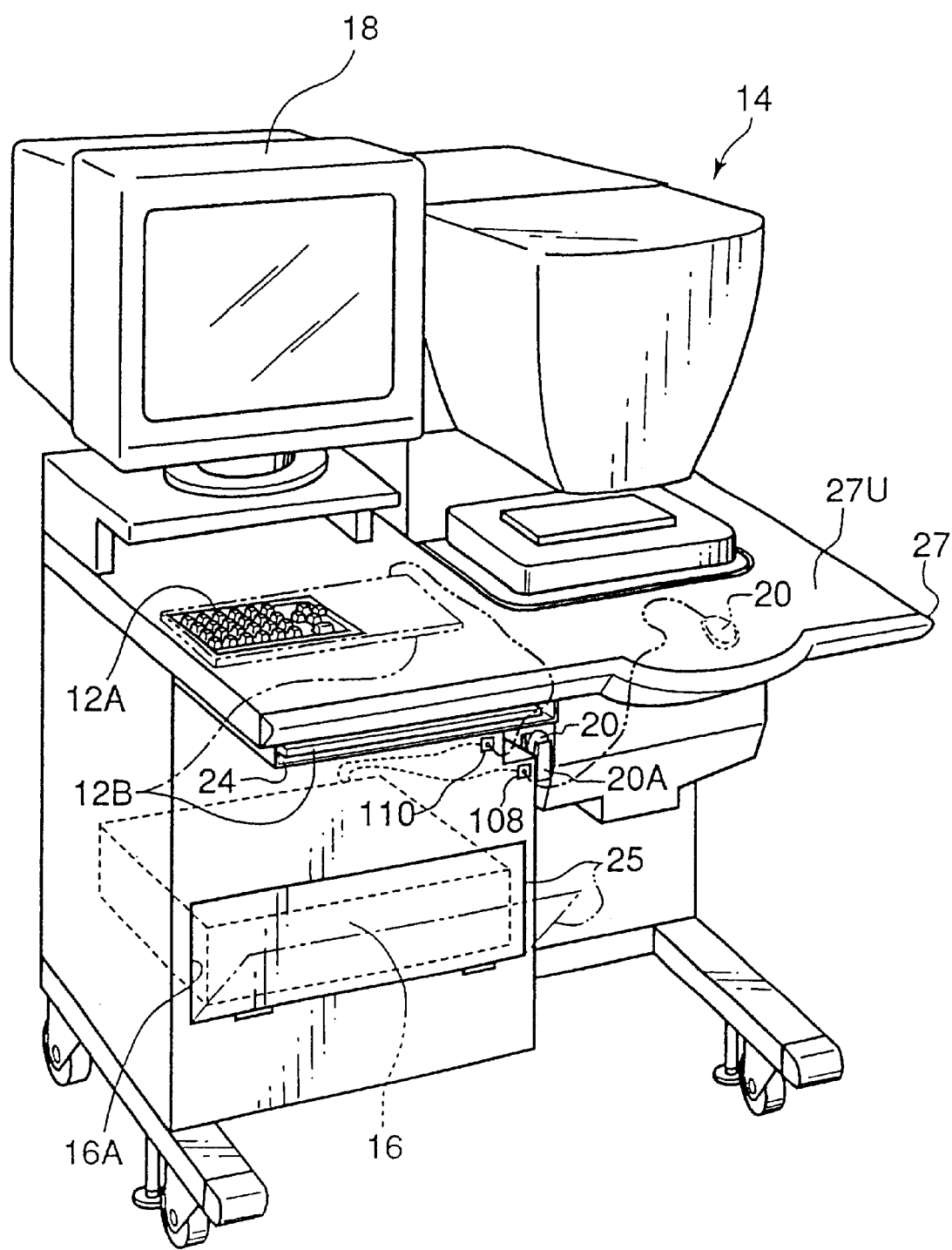
FIG. 1 is a perspective view of a line CCD scanner.

As shown in FIG. 1, a line CCD scanner (image reading apparatus) 14 relating to the present embodiment is disposed on a working table 27 on which an image processing section 16, a mouse 20, two types of keyboards 12A and 12B, and a display 18 are provided.

The keyboard 12A is embedded in a working surface 27U of the working table 27. The other keyboard 12B is accommodated within a drawer 24 of the working table 27 when not in use and is taken out from the drawer 24 and placed on the keyboard 12A when in use. At this time, a cord of the keyboard 12B is connected to a jack 110 connected to the image processing section 16.

A cord of the mouse 20 is connected to the image processing section 16 via a hole 108 provided in the working table 27. The mouse 20 is accommodated within a mouse holder 20A when not in use and is taken out from the mouse holder 20A and placed on the working surface 27U when in use.

The image processing section 16 is accommodated within an accommodating section 16A provided at the working table 27 and the accommodating section 16A is closed by an opening/closing door 25. The image processing section 16 can be taken out by opening the opening/closing door 25.

The line CCD scanner 14 reads photographic film images recorded onto a photosensitive material such as a photographic film or the like (a negative film, a reversal film, or the like). The line CCD scanner 14 can read photographic film images of, for example, a 135-size photographic film, a 10-size photographic film, a photographic film on which a transparent magnetic layer is formed (240-size photographic film: a so-called APS photographic film), and a 120-size photographic film and a 220-size photographic film (Brownie films). In the line CCD scanner 14, the photographic film images of the above-described photographic film to be read are read by a line CCD and image data is output.

The photographic film is a film which is subjected to developing processing after a subject is photographed and in which negative or positive images are visible.

The image data output from the line CCD scanner 14 is input to the image processing section 16, the input image data is subjected to various image processings such as correction or the like and output to an unillustrated laser printer section as image data for recording.

Figure 3:
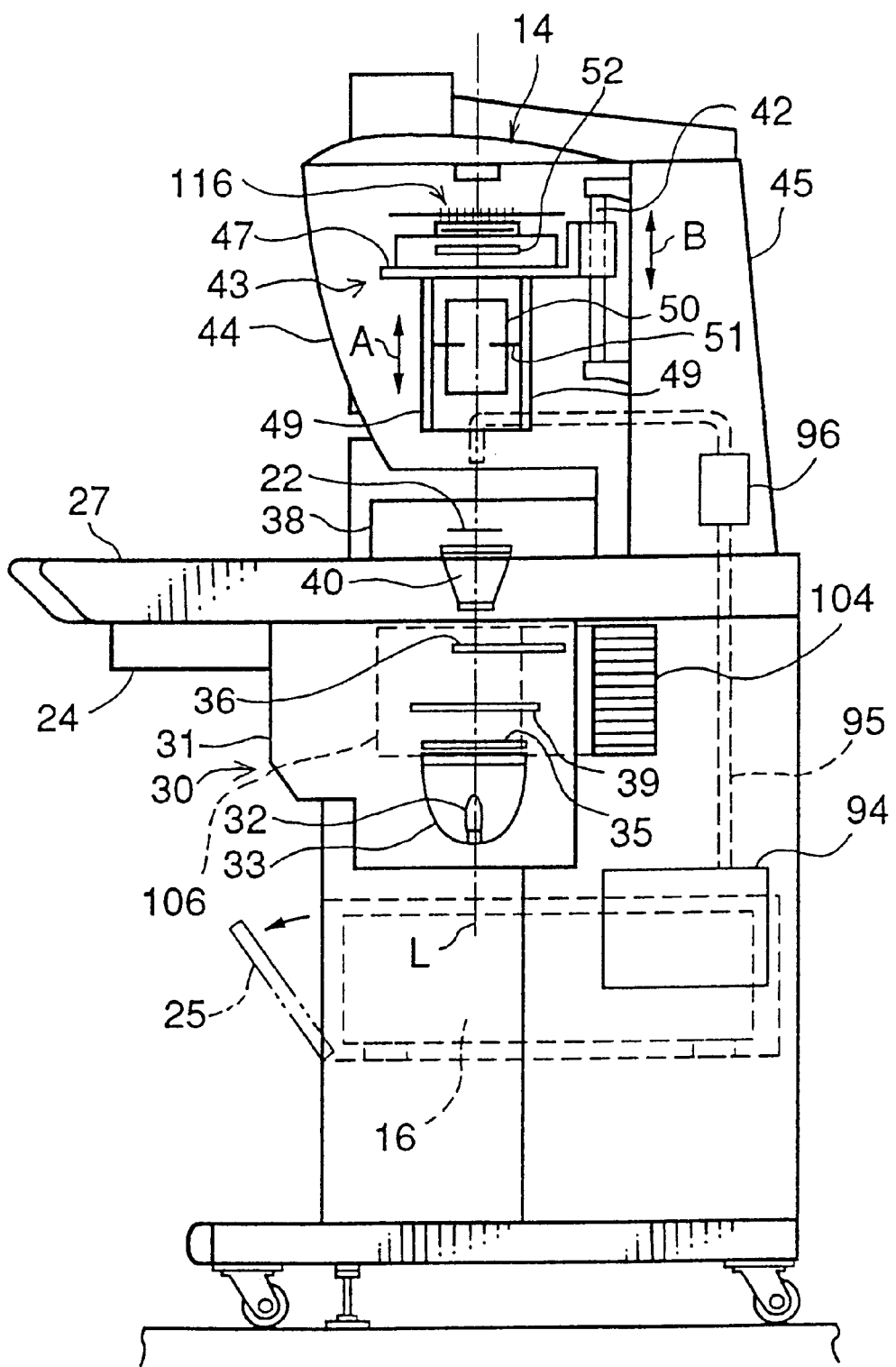
FIG. 3 is a side cross-sectional view of the optical system of the line CCD scanner.

As shown in FIGS. 2 and 3, an optical system of the line CCD scanner 14 includes a light source section 30 which serves as an illuminating device and is disposed at the lower portion of the working table 27, a diffusion box 40 which is supported by the working table 27, a film carrier 38 which serves as a conveying device and is placed on the working table 27, and a reading section 43 which is disposed on the opposite side of the working table 27 with respect to the light source section 30.

The light source section 30 is accommodated within a casing 31 made of a metal, and a lamp 32 formed by a halogen lamp, a metal halide lamp, or the like is disposed within the casing 31.

A reflector 33 is provided around the lamp 32. A portion of light which has been irradiated from the lamp 32 is reflected by the reflector 33 and irradiated in a predetermined direction. A plurality of fans 34 are provided on the sides of the reflector 33. The fans 34 are operated while the lamp 32 is lit such that the interior of the casing 31 is prevented -from overheating.

On the side of the reflector 33 towards which the light is irradiated, a UV/IR cut filter 35, an aperture 39, and a turret 36 (see also FIG. 4B) are provided in that order. The UV/IR cut filter 35 prevents temperature rise of a photographic film 22 and improves reading accuracy by cutting wavelength light in an ultraviolet region and an infrared region along an optical axis L of the light irradiated from the reflector 33. The aperture 39 adjusts the amount of light from the lamp 32 and the amount of irradiated light from the reflector 33. A balance filter 36N for a negative film and a balance filter 36P for a reversal film are fit into the turret 36. The turret 36 appropriately determines a color component of light to reach the photographic film 22 and the reading section 43 in accordance with the type of photographic film 22 (negative film/reversal film).

Figure 4A:
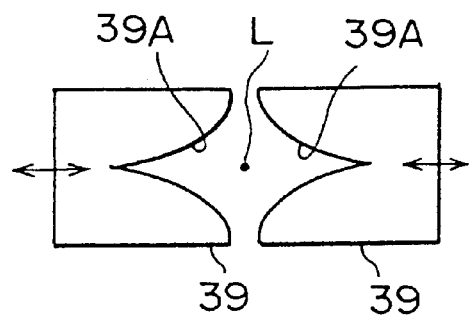
FIG. 4A is a plan view which shows an example of an aperture.

The aperture 39 is formed by a pair of plate members which are disposed with the optical axis L therebetween, and the pair of plate members are slidable so as to move closer to or away from each other. As shown in FIG. 4A, a notch 39A is formed at one end side of each of the pair of plate members of the aperture 39 so that a cross-sectional surface area of the plate member in the direction orthogonal to the slide direction continuously changes from the one end side to the other end side in the slide direction. The sides of the plate members, at which the notches 39A are formed, are disposed so as to oppose each other.

In the above-described structure, any one of the filters (36N and 36P) in accordance with the type of photographic film is placed on the optical axis L so that light having a desirable optical component is obtained, and the amount of light which passes through the aperture 39 is adjusted to a desirable amount in accordance with the position of the aperture 39.

The configuration of the diffusion box 40 is formed so that the length of the photographic film 22, which is conveyed by the film carrier 38, in the conveying direction is shorter (see FIG. 2) and the length thereof in the direction orthogonal to the conveying direction (the transverse direction of the photographic film 22) is longer (see FIG. 3) towards the upper portion, i.e., towards the photographic film 22. Further, light diffusion plates (not shown) are attached to both the side of the diffusion box 40 at which the light enters and the side of the diffusion box 40 from which the light exits. The above-described diffusion box 40 is used for a 135-size photographic film, however, diffusion boxes (not shown) which have configurations in accordance with other photographic films are also prepared.

The light which is incident on the diffusion box 40 is a slit light, in which the transverse direction of the photographic film 22 is a longitudinal direction (the direction intersecting the conveying direction (the vertical direction in the present embodiment)), toward the film carrier 38 (i.e., the photographic film 22). The slit light is converted into diffused light by the light diffusion plate and irradiated. Since the light irradiated from the diffusion box 40 is converted into diffused light, unevenness in the amount of light which is irradiated onto the photographic film 22 is reduced, the slit light having uniform amount of light is irradiated onto the photographic film images, and even if the photographic film images are damaged, the damage is not conspicuous.

The film carrier 38 and the diffusion box 40 are prepared for each type of the photographic film 22 and selected in accordance with the photographic film 22.

An elongated opening (not shown) which is longer than the width of the photographic film 22 in the transverse direction thereof is provided at a position, on each of the upper and lower surfaces of the film carrier 38, which corresponds to the optical axis L. The slit light from the diffusion box 40 is irradiated onto the photographic film 22 via the opening provided on the lower surface of the film carrier 38, and the light transmitted through the photographic film 22 reaches the reading section 43 via the opening provided on the upper surface of the film carrier 38.

The film carrier 38 is provided with an unillustrated guide which guides the photographic film 22 so that the photographic film 22 is bent at a position (reading position) onto which the slit light from the diffusion box 40 is irradiated. In this way, planarity of the photographic film 22 at the reading position is maintained.

Further, the diffusion box 40 is supported so that the upper surface approaches the above-described reading position. Thus, a notch portion is provided on the lower surface of the film carrier 38 so that the film carrier 38 and the diffusion box 40 do not interfere with each other when the film carrier 38 is loaded.

The film carrier 38 is formed so that the photographic film 22 can be conveyed at a plurality of speeds in accordance with the densities or the like of the photographic film images to be subsequently fine scanned at the time of pre-scan or fine scan.

The reading section 43 is accommodated within a casing 44. A mounting stand 47 is provided within the casing 44 and a line CCD 116 is attached onto the upper surface of the mounting stand 47. A plurality of supporting rails 49 are hung from the mounting stand 47. A lens unit 50 is supported at the supporting rails 49 so as to be slidable in the directions of arrow A and moves closer to or away from the working table 27 for changing magnifications such as expansion/contraction or the like. A supporting frame 45 is stood upright at the working table 27. The mounting stand 47 is supported at a guide rail 42 attached to the supporting frame 45 so as to be slidable in the directions of arrow B and moves closer to or away from the working table 27 for changing magnifications as described above or maintaining a conjugate length at the time of autofocusing. The lens unit 50 is formed by a plurality of lenses and a lens aperture 51 is provided between the lenses. As shown in FIG. 4C, the lens aperture 51 includes a plurality of aperture plates 51A which are molded substantially C-shaped. The aperture plates 51A are disposed evenly around the optical axis L. One end portion of each of the aperture plates 51A is axially supported by a pin and the aperture plate 51A is rotatable around the pin. The plurality of aperture plates 51A are connected via unillustrated links and rotated in the same direction when driving force of a lens aperture driving motor (to be described later) is transmitted. As the aperture plates 51A rotate, the surface area of a portion which is formed around the optical axis L and not shielded by the aperture plates 51A (a substantially stellate portion in FIG. 4C) and the amount of light transmitted through the lens aperture 51 are changed.

In the line CCD 116, three lines of a sensing portion, in which a plurality of photoelectric transducing elements such as CCD cells, photodiodes, or the like are disposed in a row in the transverse direction (the direction which intersects the conveying direction (the vertical direction in the present embodiment)) of the photographic film 22 and an electronic shutter mechanism is provided, are provided parallel to each other at intervals, and any one of color-separation filters of R, G, and B is attached to the light incident side of the sensing portion (a so-called 3-line color CCD). Moreover, a transfer portion which is formed by a plurality of CCD cells is provided in a vicinity of each of the sensing portions so as to correspond to each of the sensing portions, and charge which is accumulated in each of the CCD cells of each of the sensing portions is transferred in succession via the corresponding transfer portion.

Further, a CCD shutter 52 is provided at the light incident side of the line CCD 116. As shown in FIG. 4D, an ND filter 52ND is fit into the CCD shutter 52. The CCD shutter 52 is rotated in the direction of arrow u and is switched to any one of a completely closed state in which light which is incident on the line CCD 116 is shielded for dark correction (a portion 52B or the like into which the ND filter 52ND is not fit is placed at a position 52C including the optical axis L), a completely opened state in which light is incident on the line CCD 116 for ordinary reading or bright correction (a position in FIG. 4D), and a light reduced state in which light which is incident on the line CCD 116 is reduced by the ND filter 52ND for linearity correction (the ND filter 52ND is placed at the position 52C).

As shown in FIG. 3, a compressor 94 which generates cooling air for cooling the photographic film 22 is disposed at the working table 27. The cooling air generated by the compressor 94 is guided and supplied to an unillustrated reading portion of the film carrier 38 (toward the base surface of a reading region of the photographic film 22) by a guide pipe (hose) 95 serving as a guide device. In this way, the region in which a reading portion of the photographic film 22 is placed can be cooled. In this case, the cooling air is guided to the base surface of the photographic film 22. However, the present invention is not limited to this and the cooling air may be guided to an emulsion surface of the photographic film 22 or both the base and emulsion surfaces thereof. The guide pipe 95 penetrates through a flow amount sensor 96 which detects the amount of flow of the cooling air. Compared to a fan, the compressor 94 generates cooling air whose amount of flow, rate of flow, pressure, or the like are large. Thus, the cooling air generated by the compressor 94 can be guided to the reading portion of the film carrier 38 by the guide pipe 95 in a state in which the amount of flow, the rate of flow, the pressure, or the like are maintained. Accordingly, the degrees of freedom in disposing the compressor 94 are large. In this case, the compressor 94 is provided in the working table 27. However, the present invention is not limited to this and the compressor 94 may be provided at the film carrier 38. The number of compressors 94 is not limited to one and a plurality of compressors 94 may be provided. Namely, at least one compressor 94 may be provided at each of the working table 27 and the film carrier 38. In this case, the flow amount sensor is used. However, the present invention is not limited to this and a sensor which detects velocity of the cooling air or a pressure sensor which detects pressure thereof may be provided. The amount of flow may be estimated from these detected values.

The compressor 94 may be a linear piston type or a diaphragm type. In the diaphragm-typed compressor, air is discharged by moving forward and backward a plate-shaped elastic material such as a rubber using electromagnetic force of a coil.

A schematic structure of an electric system of the line CCD scanner 14 and the image processing section 16 is explained using FIG. 6 with reference to a principal portion of the optical system of the line CCD scanner 14 shown in FIG. 5.

The line CCD scanner 14 includes a microprocessor 46 which serves as a control device and controls the entire line CCD scanner 14. RAM 68 (e.g., SRAM) and ROM 70 (e.g., ROM which can rewrite the content of storage) are connected to the microprocessor 46 via a bus 66, and a lamp driver 53, the flow amount sensor 96, and a motor driver 48 are connected thereto. The lamp driver 53 turns on/off the lamp 32 in accordance with the instruction from the microprocessor 46. Further, when the photographic film images of the photographic film 22 are read, the microprocessor 46 operates the compressor 94 for supplying the cooling air to the photographic film 22. The flow amount sensor 96 detects the amount of flow of the cooling air and the microprocessor 46 detects abnormality.

Further, the microprocessor 46 is connected to a temperature sensor 71, which serves as a detection device and detects the temperature in a vicinity of a light illuminated region of the photographic film, and a carrier loading detection sensor 72, which serves as an optical or mechanical loading detection device and detects whether the film carrier 38 is loaded or not. Because the temperature sensor 71 detects the temperature in the vicinity of the light illuminated region of the photographic film 22, the temperature in the vicinity of the most heated region of the photographic film 22 can be detected.

Moreover, a turret driving motor 54 and a turret position sensor 55 (see also FIG. 4B) are connected to the motor driver 48. The turret driving motor 54 rotationally drives the turret 36 in the direction of arrow t in FIG. 4B so that any one of the balance filter 36N for a negative film and the balance filter 36P for a reversal film of the turret 36 is placed on the optical axis L, and the turret position sensor 55 detects a reference position (unillustrated notch) of the turret 36. The motor driver 48 is further connected to an aperture driving motor 56 which slides the aperture 39, an aperture position sensor 57 which detects the position of the aperture 39, a reading section driving motor 58 which slides the mounting stand 47 (i.e., the line CCD 116 and the lens unit 50) along the guide rail 42, a reading section position sensor 59 which detects the position of the mounting stand 47, a lens driving motor 60 which slides the lens unit 50 along the supporting rails 49, a lens position sensor 61 which detects the position of the lens unit 50, a lens aperture driving motor 62 which rotates the aperture plates 51A of the lens aperture 51, a lens aperture position sensor 63 which detects the position of the lens aperture 51 (the positions of the aperture plates 51A), a shutter driving motor 64 which switches the CCD shutter 52 to any one of the completely closed state, the completely opened state, and the light reduced state, a shutter position sensor 65 which detects the position of the shutter 52, and a fan driving motor 37 which drives the fans 34.

In the microprocessor 46, when the pre-scan (preliminary reading) and the fine scan (main reading) are carried out by the line CCD 116, the turret 36 is rotationally driven by the turret driving motor 54 on the basis of the position of the turret 36 detected by the turret position sensor 55 and the position of the aperture 39 detected by the aperture position sensor 57, the aperture 39 is slid by the aperture driving motor 56, and the light irradiated onto the photographic film images is adjusted.

Further, in the microprocessor 46, zoom magnification is determined in accordance with the sizes of photographic film images, whether trimming is effected, or the like, the mounting stand 47 is slid by the reading section driving motor 58 on the basis of the position of the mounting stand 47 which is detected by the reading section position sensor 59 so that the photographic film images are read by the line CCD 116 at the above-determined zoom magnification, and the lens unit 50 is slid by the lens driving motor 60 on the basis of the position of the lens unit 50 which is detected by the lens position sensor 61.

At the time of focusing control (autofocus control) in which a light-receiving surface of the line CCD 116 is matched with an image forming position of the photographic film image by the lens unit 50, only the mounting stand 47 is slid by the reading section driving motor 58 in the microprocessor 46. This focusing control can, for example, maximize a contrast of the photographic film image read by the line CCD 116 (a so-called image contrast method). Instead, it is possible that a distance sensor which measures a distance between the photographic film 22 and the lens unit 50 (or the line CCD 116) by infrared rays or the like is provided and that the focusing control is effected on the basis of the distance detected by the distance sensor instead of data of the photographic film image.

On the other hand, a timing generator 74 is connected to the line CCD 116. The timing generator 74 generates various types of timing signals (clock signals) for operating the line CCD 116, A/D converters 82, which will be described later, or the like. The signal output ends of the line CCD 116 are connected to the A/D converters 82 via amplifiers 76. The signals which have been output from the line CCD 116 are amplified by the amplifiers 76 and converted into digital data by the A/D converters 82.

The output ends of the A/D converters 82 are connected to the image processing section 16 via correlation double sampling circuits (CDS) 88 and an interface (I/F) circuit 90 in that order. In the CDSs 88, feedthrough data which shows the level of feedthrough signals and pixel data which shows the level of pixel signals are sampled and the feedthrough data is subtracted from the pixel data at each pixel. Then, the results of operation (pixel data which accurately corresponds to the amount of charge to be accumulated at each CCD cell) are successively output to the image processing section 16 as scan image data via the I/F circuit 90.

Because R, G, and B reading signals are output in parallel from the line CCD 116, the signal processing system formed by the amplifiers 76, the A/D converters 82, and the CDSs 88 have three routes. The R, G, and B image data are input in parallel from the I/F circuit 90 to the image processing section 16 as scan image data.

Further, the display 18, the keyboards 12A and 12B, the mouse 20, and the film carrier 38 which are mentioned before are connected to the image processing section 16.

Next, the line CCD scanner 14 relating to the present embodiment will be explained.

When the photographic film 22 is inserted into the film carrier 38, an unillustrated photographic film identification sensor of the film carrier 38 detects the photographic film 22 and the film carrier 38 automatically starts the conveyance of the photographic film 22.

At the same time, in the line CCD scanner 14, the respective portions are moved in a preparatory state for effecting preliminary reading (hereinafter, "pre-scan") for obtaining the optimum exposure conditions, the pre-scan is carried out while the photographic film 22 is conveyed at predetermined constant speed, and the images recorded onto the photographic film 22 are read roughly.

In the above-described preparatory state, projected magnification (optical magnification) is set to the line CCD 116 by the lens unit 50, an amount of light irradiated from the lamp 32 is set, a reading cycle (formed by accumulation time and transfer time) at the line CCD 116 is set, or the like.

Further, in the pre-scan, the images in a processing unit of the photographic film 22, e.g., one strip if the photographic film 22 is a strip-shaped elongated photographic film, are read at once under the same device conditions (the above-described optical magnification, the amount of light to be irradiated, the reading cycle, or the like).

When the pre-scan ends, a so-called setup operation, which obtains exposure conditions for obtaining the optimum image quality, is carried out on the basis of the images read at the time of pre-scan. Further, as occasion demands, the images read at the time of pre-scan are corrected according to the setup conditions and the positive images in the finished states are displayed on the display 18. An operator checks the positive images on a monitor, further corrects manually the density, color, or the like of the images if necessary, effects trimming operation as occasion demands, and determines the range of images to be read. Moreover, when the images are output onto a photographic printing paper, the operator determines the size (a so-called print size) of the output images, the number of outputs, or the like. After all of the conditions are set in this way, the operator instructs to carry out the main reading (hereinafter, "fine scan") by means of key input or the like.

As a result, while the photographic film 22 which has been conveyed to the distal end of the photographic film 22 in the pre-scan is conveyed at this time in the direction opposite that of the pre-scan, the images recorded onto the photographic film 22 are moved in a device state which is required for the fine scan.

In the above-described device state which is required for the fine scan, the conveying speed of the photographic film 22 is set, the above-described optical magnification is set, the above-described amount of light to be irradiated is set, the above-described reading cycle is set, or the like. In this way, optimal exposure conditions are set at each image frame which is to be read hereinafter.

Then, after the images have been moved in the above-described device state, the line CCD scanner 14 controls the film carrier 38 and fine-scans the images recorded onto the photographic film 22 at each frame under the determined exposure conditions while the photographic film 22 is conveyed in the direction opposite that of the pre-scan.

The image signals which have been read and obtained by the line CCD 116 in the above-described fine scan are amplified by the amplifiers 76 and converted into digital data (image data) by the A/D converters 82.

Deviations (a so-called color deviation) of lines of the above-described image data in the main scanning direction which are read by three lines of the line CCD 116 are corrected by the CDSs 88, and then the image data is input to the image processing section 16 via the interface (I/F) circuit 90. The image data is converted into image data having a predetermined number of pixels by an unillustrated expansion/contraction circuit within the image processing section 16 and final image data is obtained. This image data is transferred to an image recording device which is separate from the present invention, and images are scan-exposed onto a photographic printing paper and subjected to developing processing. A desirable photographic print is thereby obtained.

When the photographic film 22 is inserted into the film carrier 38 or the photographic film 22 is conveyed by the film carrier 38 in the above-described operation, the photographic film 22 is cooled at the same time that the pre-scan is started and while the photographic film 22 is conveyed. Namely, the compressor 94 is operated. On the other hand, when it is detected that the fine scan ends or the photographic film 22 is removed from the reading region, the cooling of the photographic film 22 is stopped. Namely, the operation of the compressor 94 is stopped.

It is possible that the photographic film 22 is cooled in a weak cooling state at first and is gradually cooled in a strong cooling state, and the cooling is stopped in the strong cooling state and is gradually cooled in the weak cooling state. Namely, it is possible that the cooling does not stop completely, the weak cooling state continues and can immediately cope with the insertion of the next photographic film 22.

When a cooling device which can change cooling capacity by changing voltage at the time of cooling, the voltage is controlled so that the cooling state is controlled. When the cooling device which can change cooling capacity by an inverter controlled type thereat, an inverter device is controlled so that the cooling state is controlled. Further, the cooling state may be controlled by opening and closing an opening of a nozzle portion which is a blow port.

The above-described operation will be further explained with reference to FIGS. 7A and 7B. Namely, FIG. 7A shows a basic operation of reading which corresponds to images of a so-called prints with film processing in which a series of frame images 77 of the 35 [mm]-size photographic film 22 (strips) are read and successively converted into print images. FIG. 7B shows an operation of reading (mainly conveying speed) when a specific frame image (high density frame) mixes with ordinary frame images in the photographic film 22. Namely, the conveying speed of reading the specific frame image is lower than the conveying speed (high speed) of reading the images other than the specific frame image. The information on the high density of the image or the like is obtained from the pre-scan.

In reality, each portion of the photographic film 22 is conveyed so as to pass the reading position. In FIGS. 7A and 7B, the reading positions are moved relatively to the photographic film 22.

As described above, when the series of images are read, an illuminated region stays at a predetermined photographic film position P for a predetermined time in order to reverse the conveying direction during the pre-scan and the fine scan. Moreover, the conveying speed of reading the specific frame image is lower than the conveying speed of reading the images other than the specific frame image, i.e., an illuminated region stays at a predetermined position Q for a predetermined time in order to switch the conveying speed.

In the present embodiment, in light of the aforementioned, when the illuminated region stays at the predetermined position for a predetermined time, the amount of light irradiated onto the photographic film 22 is reduced by stopping down the aperture 39 by a predetermined amount. Thus, overheating of the photographic film 22 is prevented.

FIG. 8 shows a result in which a relationship between the illumination time and the temperature of the photographic film 22 is tested under the conditions in which a halogen lamp (the lamp 32) has 400 W, the velocity of cooling air at the reading position is 0 to 10 (m/s), and the temperature of the cooling air is a room temperature.

The temperature of the photographic film 22 is described along an axis of ordinates. The lines which are parallel to the axis of abscissas are at 80° C., 107° C., and 113° C. and show respectively a final reaching temperature target value in the illuminated region, a glass transition temperature of a TAC base material of a 35 [mm]-size photographic film, and a glass transition temperature of a PEN base material of an APS-size photographic film. The illumination time is described along the axis of abscissas and are changed in accordance with the conveying speed and the length of the illumination region in the conveying direction.

The following points can be understood from the relationship between the illumination time and the temperature of the photographic film 22 shown in FIG. 8.

First, when there is no cooling air (V=0 [m/s]), only the illumination time which is 2.5 [s] or shorter is permitted in order to maintain the temperature of the photographic film 22 at 80° C. or lower.

Second, when the velocity of the cooling air is 4 [m/s], the illumination time up to 5 [s] is permitted in order to maintain the temperature of the photographic film 22 at 80° C. or lower. Further, when the velocity of the cooling air is 6 [m/s], the temperature of the photographic film 22 can be maintained at 80° C. or lower even if the photographic film is stopped.

Third, when the photographic film 22 is stopped in the illuminated region for a long time (the aforementioned stay) in a state in which the velocity of the cooling air is 4 [m/s] or lower, in order to maintain the temperature at 80° C. or lower, it is necessary to take another measure for preventing the rise of temperature.

The heat resisting temperature, in which the quality of the photographic film 22 is not deteriorated, is lower than a glass transition temperature $T_g$ on a base surface of the photographic film 22 by a predetermined value. The glass transition temperature $T_g$ on the base surface is selected because the quality deterioration temperature on the emulsion surface of the photographic film 22 is higher than the glass transition temperature $T_g$ on the base surface. When the temperature of the photographic film 22 is higher than the glass transition temperature $T_g$ on the base surface, deformation (deterioration of quality) of the film occurs since the material of the base surface becomes fluid. On the other hand, the heat resisting temperature is lower than the glass transition temperature $T_g$ by a predetermined value because, when heat is applied to the photographic film 22 in a state in which the photographic film 22 is bent with the base surface being at the inner side, a so-called creep phenomena occurs in which deformation gradually progresses even if the temperature is lower than the above-described glass transition temperature $T_g$, and further, the amount of deformation increases as the time in which the heat is applied increases. This was confirmed by the experiments or the like of the present inventors. Accordingly, when the permissible temperature of the photographic film 22 is considered, this creep phenomena is taken into account and the temperature of the film does not exceed the temperature lower than the glass transition temperature $T_g$.

Thus, the photographic film 22 may be cooled so as to not exceed the temperature lower than the glass transition temperature $T_g$.

Figure 9:
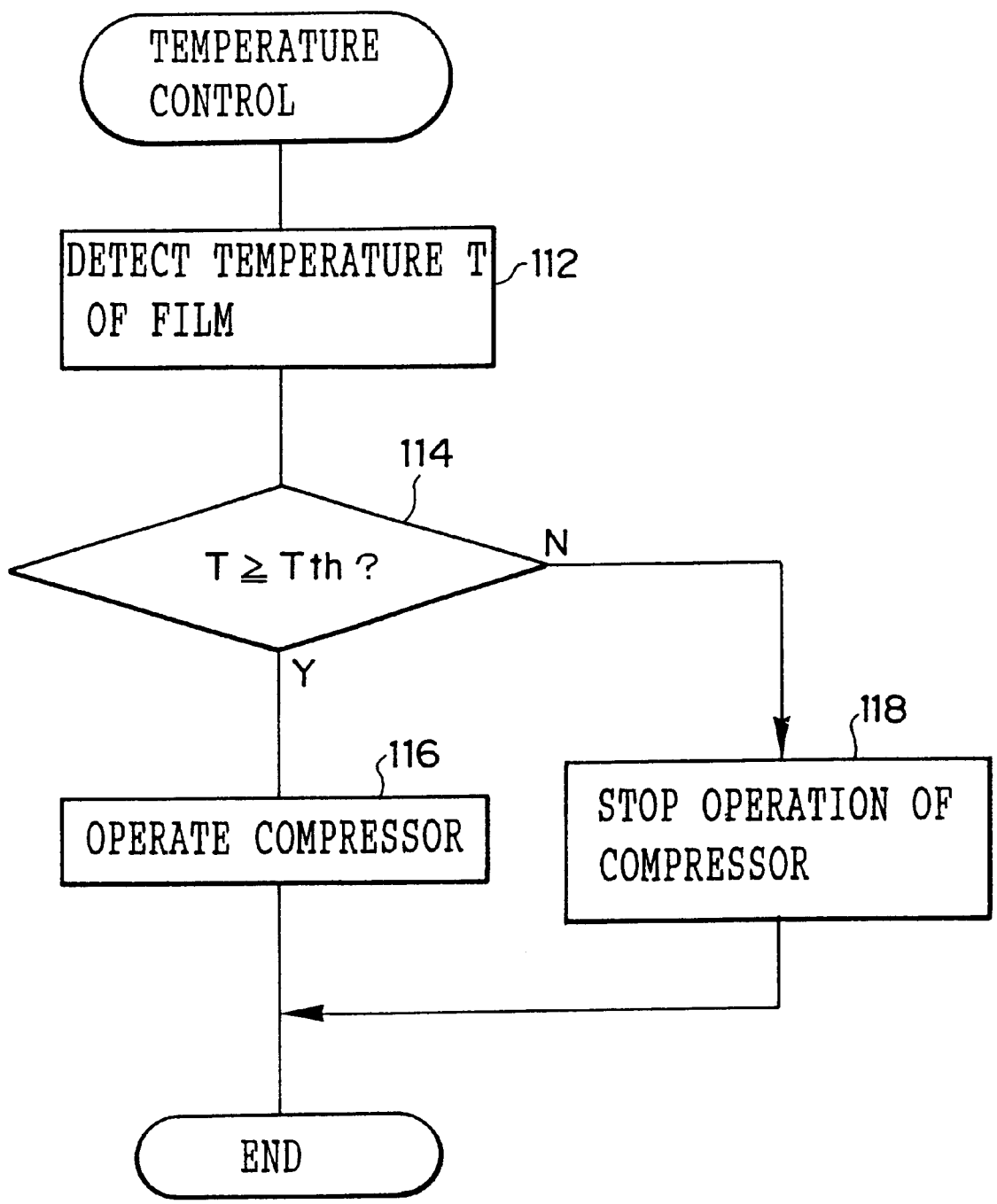
FIG. 9 is a flowchart which shows a temperature control routine.

FIG. 9 shows a temperature control routine which is started when a main power supply is input. The present temperature control routine is executed regardless of the time in which the images recorded onto the photographic film 22 are read or not.

Namely, in step 112 in FIG. 9, a temperature T of the photographic film 22 is detected. In step 114, a determination is made as to whether the temperature T of the photographic film 22 is higher than a predetermined threshold value $T_{th}$ or not. The threshold value $T_{th}$ is a temperature which is lower than a heat resisting temperature $T_o$ (the above-described glass transition temperature $T_g$) on the base surface of the photographic film 22 by a predetermined value t in which the creep phenomena is considered ($T_o$–t).

When the temperature T of the photographic film 22 is equal to or higher than the threshold value $T_{th}$, the compressor 94 is operated in step 116. Thus, the cooling air generated by the compressor 94 is guided onto the base surface of the reading region of the photographic film 22 via the guide pipe 95 and the photographic film 22 is cooled.

It is possible that a temperature sensor or a Peltier element which detects the temperature of the cooling air is provided and the temperature of the cooling air is managed.

Further, the velocity of the cooling air in the reading region of the photographic film 22 is 0.5 [m/s] to 10 [m/s], preferably 2 [m/s] to 8 [m/s]. Namely, the velocity, in which the temperature T of the photographic film 22 equals to the threshold value $T_{th}$, is selected from the results of test in FIG. 8 and the time (illumination time) in which the portions of the photographic film 22 pass the reading region which is obtained from the conveying speed of the photographic film 22 and the length of the reading region in the conveying direction. When the velocity of the cooling air exceeds 10 [m/s], it is not necessarily effective from the viewpoint of cooling efficiency. Moreover, there are a lot of drawbacks such as vibrations caused by the cooling air of the photographic film 22, noise caused by blowing the cooling air at the blow port, noise caused by the cooling such as the compressor 94 or the like, a necessary large amount of electricity consumption, or the like.

When the temperature T of the photographic film 22 is lower than the threshold value $T_{th}$, in step 118, the operation of the compressor 94 is stopped. However, the present invention is not limited to this and the compressor 94 may be operated at a small capacity.

In this way, because the cooling air generated by the compressor (the amount of flow, the velocity of flow, and the pressure of the cooling air is larger than the cooling air generated by the fan) is guided to the region, onto which the light of the conveyed photographic film is irradiated, even if the amount of light irradiated onto the photographic film is increased, deterioration of the quality of the photographic film can be prevented. Namely, because the photographic film is conveyed to the region, onto which a large amount of slit light is irradiated, and the cooling air is injected to the region of the photographic film, onto which the slit light is irradiated (the temperature of the region is higher than that of a non-illuminated region), the device in the present embodiment is greatly different from the aforementioned conventional devices in which the images recorded onto the photographic film are read when the photographic film is stationary.

Since the threshold value $T_{th}$ is determined in consideration of the heat resisting temperature $T_o$ on the base surface of the photographic film, when the temperature in the vicinity of the photographic film is lower than the heat resisting temperature on the emulsion surface and higher than the heat resisting temperature on the base surface, the deterioration of quality of the photographic film can be prevented.

As described hereinbefore, because the aperture 39 is stopped down by a predetermined amount at the time of the temperature control (see FIG. 9) and when the illuminated region stays at the predetermined position for a predetermined time, even if the conveying state of the photographic film is bad, the temperature of the photographic film can be set to the above-described threshold value or lower.

In the aforementioned embodiment, the temperature control routine is started when the main power supply is input. Namely, the input of the main power supply is one of the starting conditions of cooling. However, the present invention is not limited to this and the following operation may be implemented.

Figure 10:
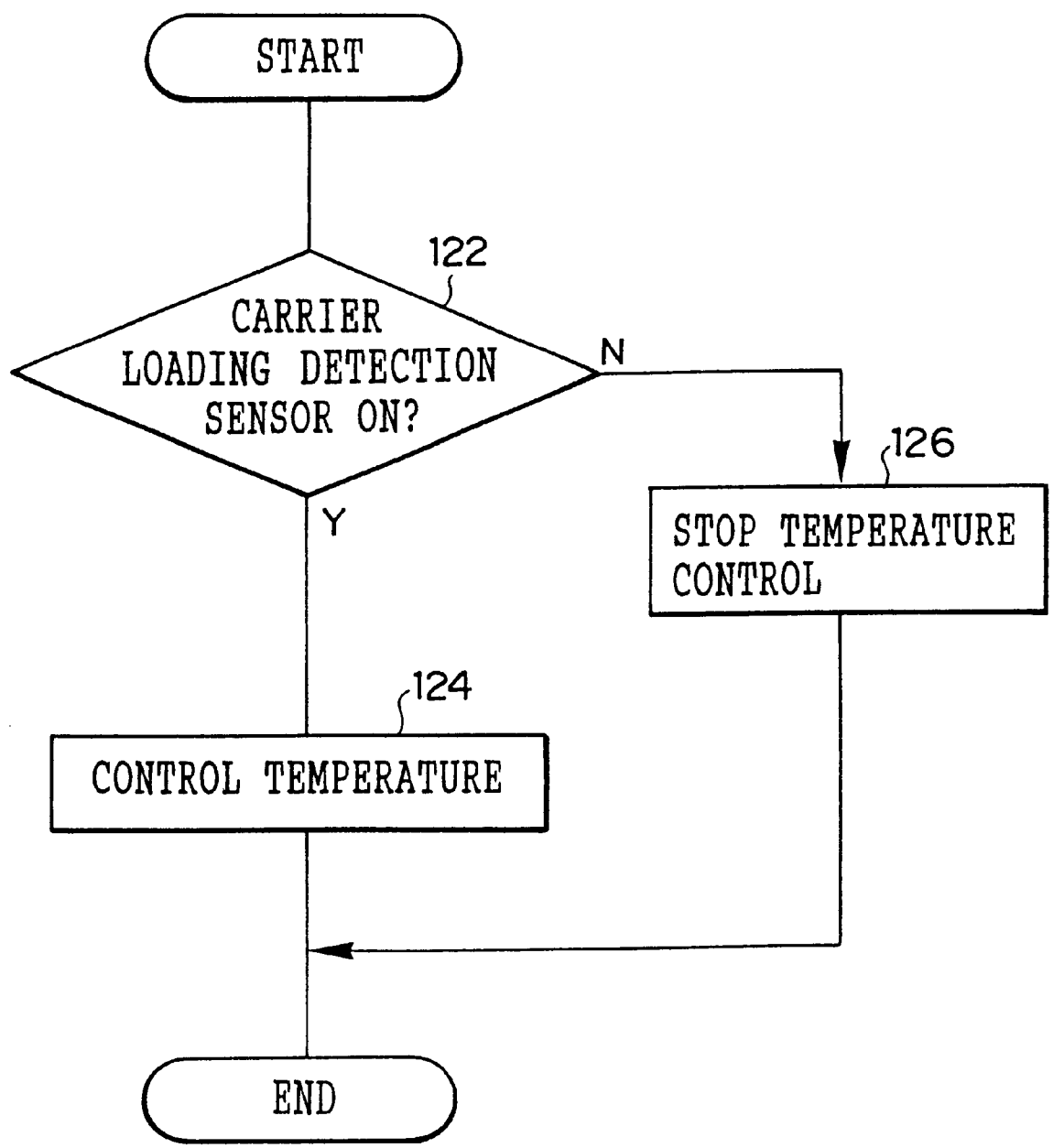
FIG. 10 is a flowchart which shows a temperature control routine relating to a variant example.

Namely, FIG. 10 shows a temperature control routine which is repeatedly executed at every predetermined time from the time in which the main power supply is input.

In step 122 in FIG. 10, a determination is made as to whether a carrier loading detection sensor 72 is turned on. When the carrier loading detection sensor 72 is turned on (when it can be determined that the photographic film exists in the region onto which the light is irradiated), i.e., when the film carrier 38 is loaded, the photographic film 22 is conveyed therefrom and the images recorded onto the photographic film 22 are read. Then, in step 124, the temperature control (the content in FIG. 9) is executed.

In this way, when the carrier loading detection sensor 72 is turned on as the condition for starting cooling, i.e., before the images recorded onto the photographic film 22 are read, the compressor 94 is operated.

On the other hand, when the carrier loading detection sensor 72 is turned off, since the film carrier 38 is removed, it is not necessary to read the images on the photographic film 22. Namely, because the light is not irradiated onto the photographic film 22, it is not necessary to cool the photographic film 22. Therefore, in step 126, the temperature control is stopped. In this way, because the temperature control is stopped when the film carrier 38 is removed as the condition for reducing cooling capacity, the photographic film can be cooled only when it is necessary and the electricity consumption can be reduced. Further, unnecessary air can be prevented from blowing against the operator.

The compressor 94 is operated before the images recorded onto the photographic film 22 are read. However, the present invention is not limited to this and the compressor 94 may be operated when the images recorded onto the photographic film 22 are read.

Figure 11:
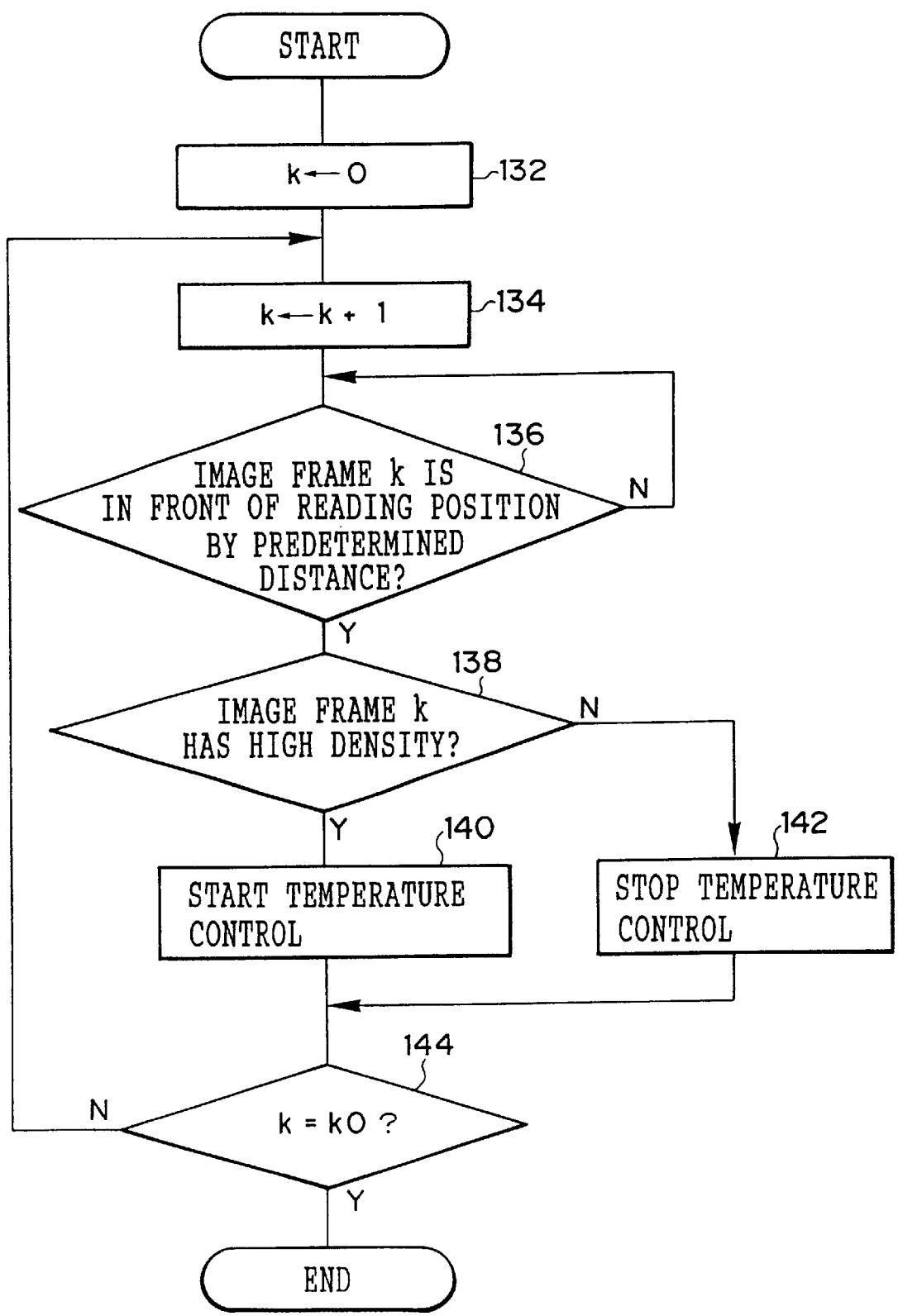
FIG. 11 is a flowchart which shows a temperature control routine relating to another variant example.

Moreover, FIG. 11 shows a temperature control routine which is executed at the time of fine scan. Namely, the temperature is controlled at the time of reading the image having predetermined density or more.

In step 132 in FIG. 11, a variable k which identifies a plurality of images recorded onto the photographic film 22 is initialized. In step 134, the variable k is incremented by 1. In step 136, a determination is made as to whether an image frame k identified by the variable k is disposed in front of the reading position by a predetermined distance.

When the image frame k is disposed in front of the reading position by the predetermined distance, in step 138, a determination is made as to whether the image frame k has predetermined density, e.g., high density (medium density or the like is possible), as the condition for starting cooling. Whether the image frame k has high density or not can be determined on the basis of the image data read at the time of pre-scan (extracted from the image processing section 16).

The determination in which the image frame k has predetermined density or not is the condition for starting cooling. This is because, as mentioned above, the conveying speed of the photographic film 22 is slower at the predetermined density, e.g., high density and, when the conveying speed thereof is slower, the amount of light irradiated onto the photographic film 22 is larger and the photographic film 22 is heated greater.

When the image frame k has high density, in step 140, the temperature control (see FIG. 9) is started. When the image frame k does not have high density, in step 142, the temperature control is stopped.

Then, in step 144, a determination is made as to whether the variable k is equal to the total number $k_o$ of image frames. When the variable k is not equal to the total number $k_o$ of image frames, the above-described processings (step 134 to step 144) are executed. When the variable k is equal to the total number $k_o$ of image frames, the present routine ends.

Figure 12:
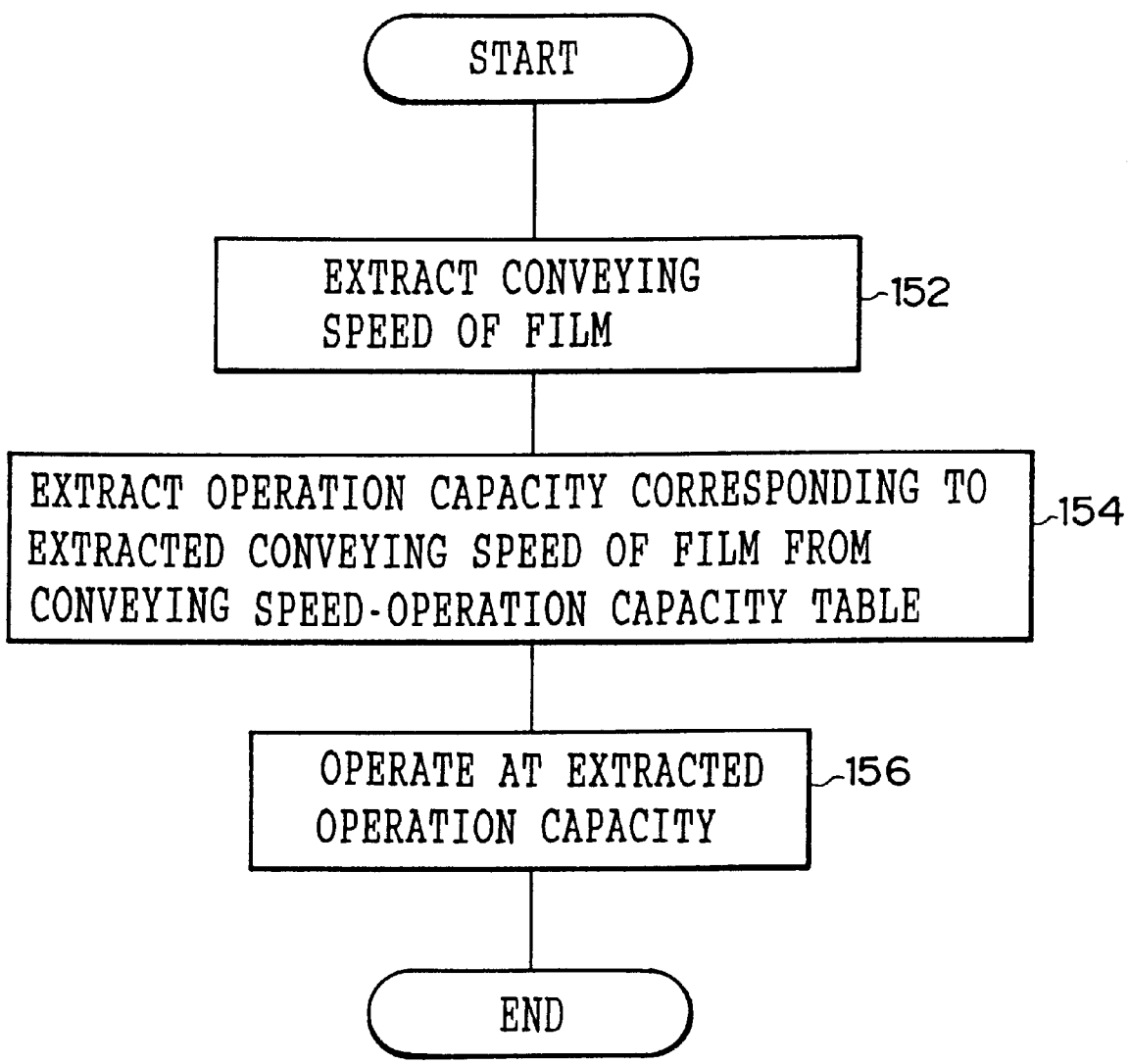
FIG. 12 is a flowchart which shows an operation control routine of a compressor.

The compressor 94 is operated at a normal condition. However, as shown in FIG. 12, the compressor 94 may be operated by changing the velocity of the cooling air in accordance with the conveying speed of the photographic film 22.

Namely, in step 152, the conveying speed of the photographic film 22 is extracted. In step 154, the operation capacity which corresponds to the conveying speed of the extracted photographic film 22 is extracted from a conveying speed—operation capacity table (Table 1). In step 156, the compressor 94 is operated at the extracted operation capacity.

Namely, the slower the conveying speed of the photographic film 22, the higher the temperature thereof. Thus, the operation capacity (cooling air velocity) is determined accordingly. Namely, the table which determines linearly or in stages the capacity which increases as the conveying speed of the photographic film 22 is reduced is provided for processing (Table 1 (an example of the table which determines the capacity in stages)).

TABLE 1

| Conveying speed of photographic film | Operation capacity |
| --- | --- |
| 0 to $v_1$ | capacity A |
| $v_1$ to $v_2$ | capacity B |
| $v_2$ to $v_3$ | capacity C |
| ... | ... |

(conveying speed $v_1$<conveying speed $v_2$<conveying speed $v_3$ ... )
(capacity A>capacity B>capacity C)

As mentioned above, since the film carrier 38 conveys the photographic film 22 at a plurality of speeds in accordance with the densities or the like of photographic film images which are subjected to fine scan therefrom at the time of pre-scan or at the time of fine scan, in the above-described processing, the compressor 94 is operated at necessary capacity in accordance with the conveying speed of the photographic film 22.

Whether the film carrier 38 is loaded, i.e., whether the photographic film 22 exists in the region onto which the light is illuminated, is determined on the basis of the signal output from the carrier loading detection sensor 72. However, the present invention is not limited to this. Whether the photographic film 22 exists in the region onto which the light is irradiated may be determined by the input of the distal end detection signal from the film carrier 38 or the input of the scan start key of the keyboard.

Further, the condition for starting cooling or the condition for reducing cooling capacity may be judged by determining whether the position of the aperture 39 detected by the aperture position sensor 57 is a position at which the quality of the photographic film is deteriorated by the amount of light illuminated onto the photographic film 22 via the aperture 39.

When interlocking, the cutting of a control line, or the like is determined and opening of the casing 31 or the like of the light source section 30 is detected, the compressor 94 may be stopped and the lamp 32 may be put out.

Further, in accordance with a difference which is obtained by subtracting the temperature T of the photographic film 22 from the threshold value $T_{th}$ or a difference which is obtained by subtracting the temperature T of the photographic film 22 from the heat resisting temperature $T_o$ of the base surface, the compressor 94 may be operated at capacity which is decreased if the difference is large. In this way, when the temperature T of the photographic film 22 is lower than the threshold value $T_{th}$ by a larger amount and the compressor 94 is operated at smaller capacity, the compressor 94 can be prevented from operating at unnecessarily high capacity and the life of the compressor 94 can be longer. In this case, a table which determines linearly or in stages the capacity which is decreased if the difference is large may be provided for the above processing.

Figure 13:
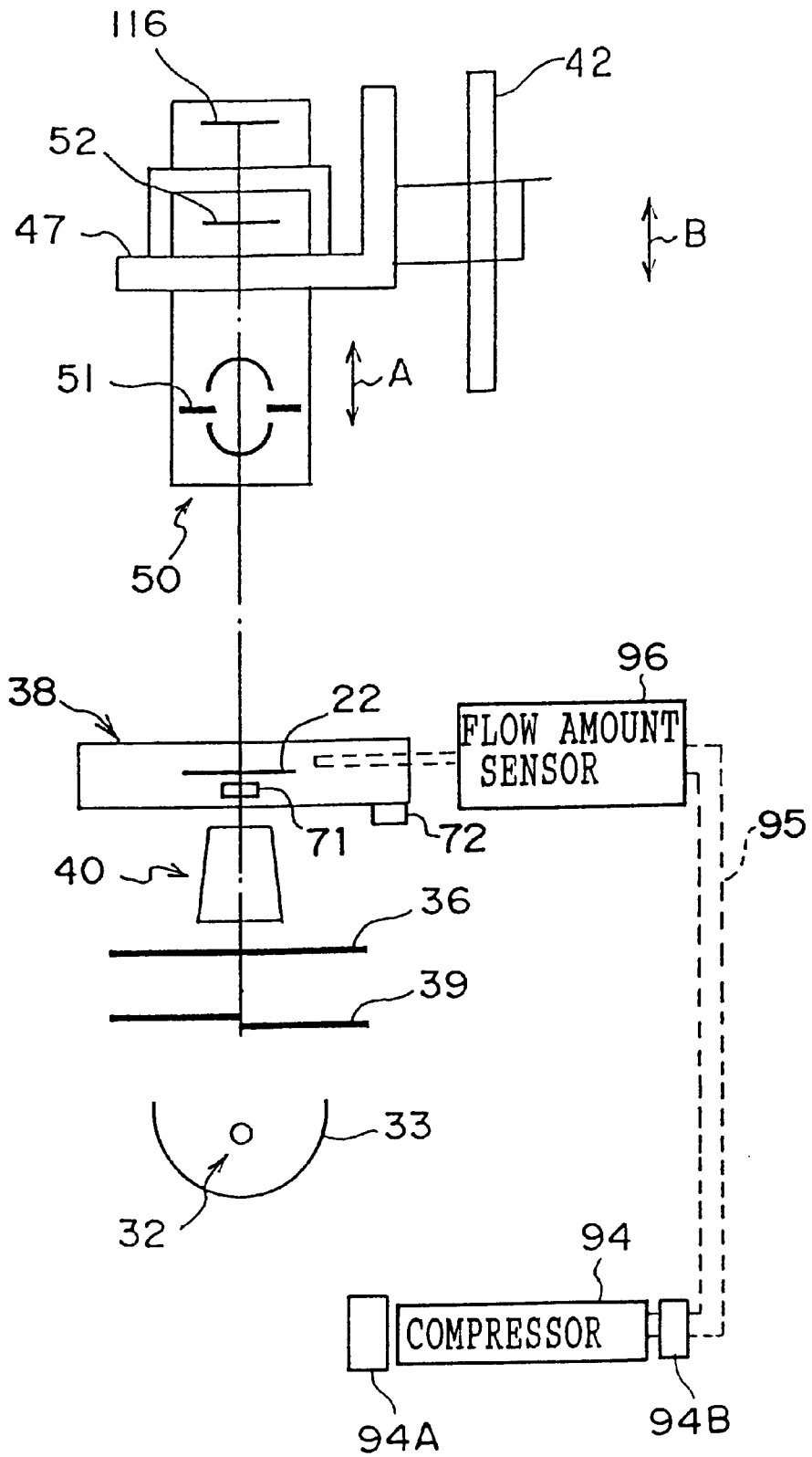
FIG. 13 is a plan view which shows only a principal portion of an optical system of a line CCD scanner when air filters are provided in the compressor.
Figure 14:
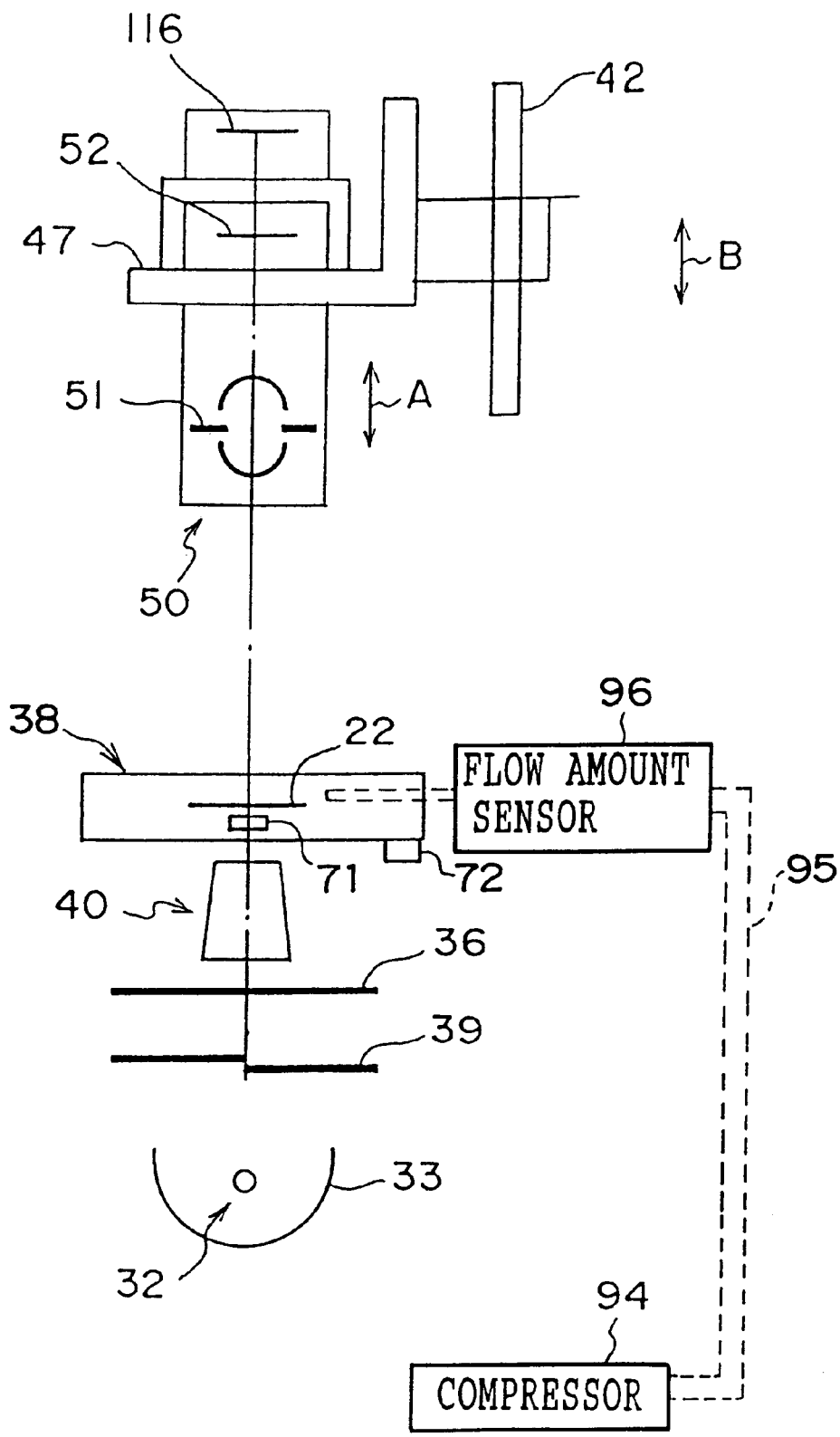
FIG. 14 is a plan view shows only a principal portion of an optical system of a line CCD scanner relating to a variant example.

Moreover, in the above-described embodiment, the description is given of a case in which the cooling air is generated by the compressor 94 having no air filter. However, the present invention is not limited to this. For example, as shown in FIG. 13, an air filter 94A can be provided at a suction port of the compressor 94 and an air filter 94B can be provided at a discharge port thereof. In this case, because dust, resin powders, or the like contained in the cooling air can be removed, adhesion of the dust or the like to the photographic film 22 is prevented. As a result, the quality of read images can be improved and the inflicting of damage on the photographic film 22 can be prevented.

Figure 15A:
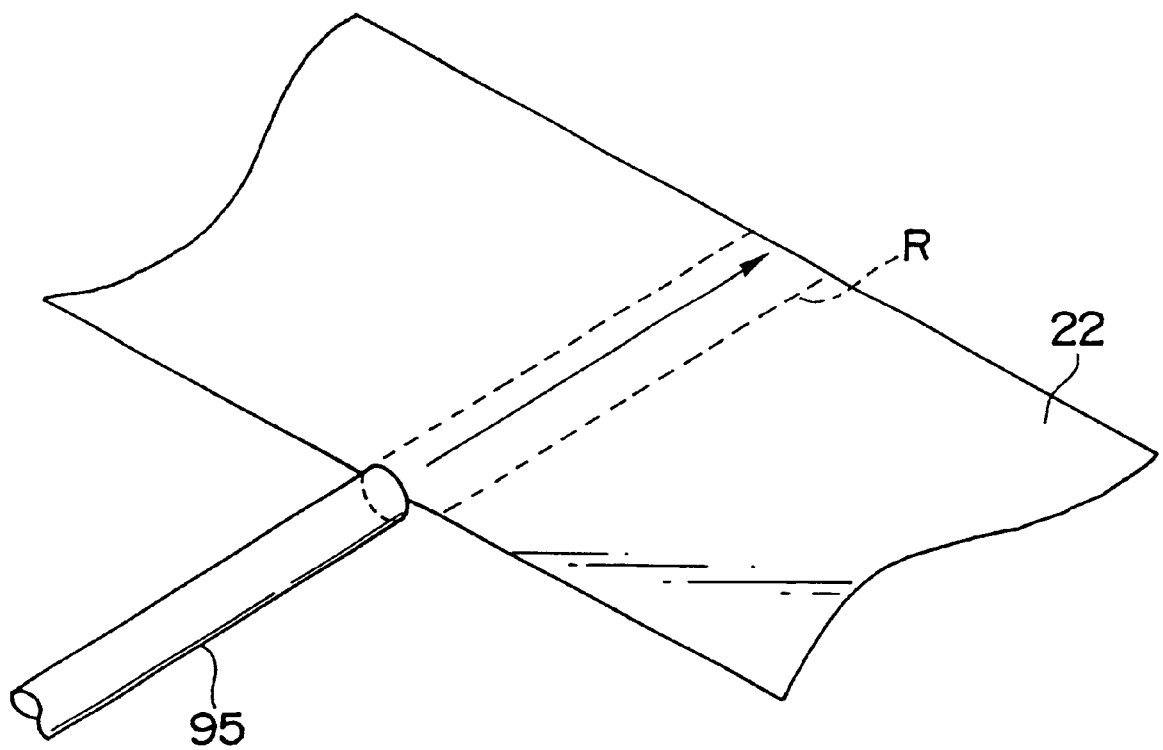
FIG. 15A is a perspective view which shows an example of a guide pipe.
Figure 15B:
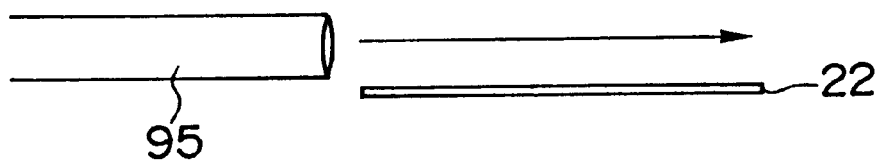
FIG. 15B is a cross-sectional view which shows the example of the guide pipe.
Figure 15C:
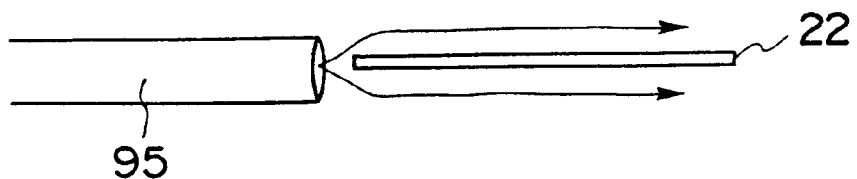
FIG. 15C is a cross-sectional view which shows a variant example of a guide pipe.

Furthermore, in the above-described embodiment, the guide pipe 95 guides the cooling air so that the cooling air blows the photographic film 22 diagonally. However, the present invention is not limited to this. As shown in FIGS. 14, 15A, 15B, and 15C, it is possible that the distal end of the guide pipe 95 reaches the interior of the film carrier 38 (FIG. 14) and the guide pipe 95 guides the cooling air so that the cooling air flows parallel to a reading region R of the photographic film 22 (see FIG. 15A). Namely, the guide pipe 95 is disposed at the exterior of the photographic film 22 and in the direction perpendicular to the longitudinal direction of the photographic film 22 so that the distal end of the guide pipe 95 is placed in the vicinity of the reading region R. As shown in FIG. 15B, the guide pipe 95 may guide the cooling air so that the cooling air flows parallel to the reading region R on one surface of the photographic film 22. As shown in FIG. 15C, the guide pipe 95 may guide the cooling air so that the cooling air flows parallel to the reading region R on both surfaces of the photographic film 22.

Figure 16:
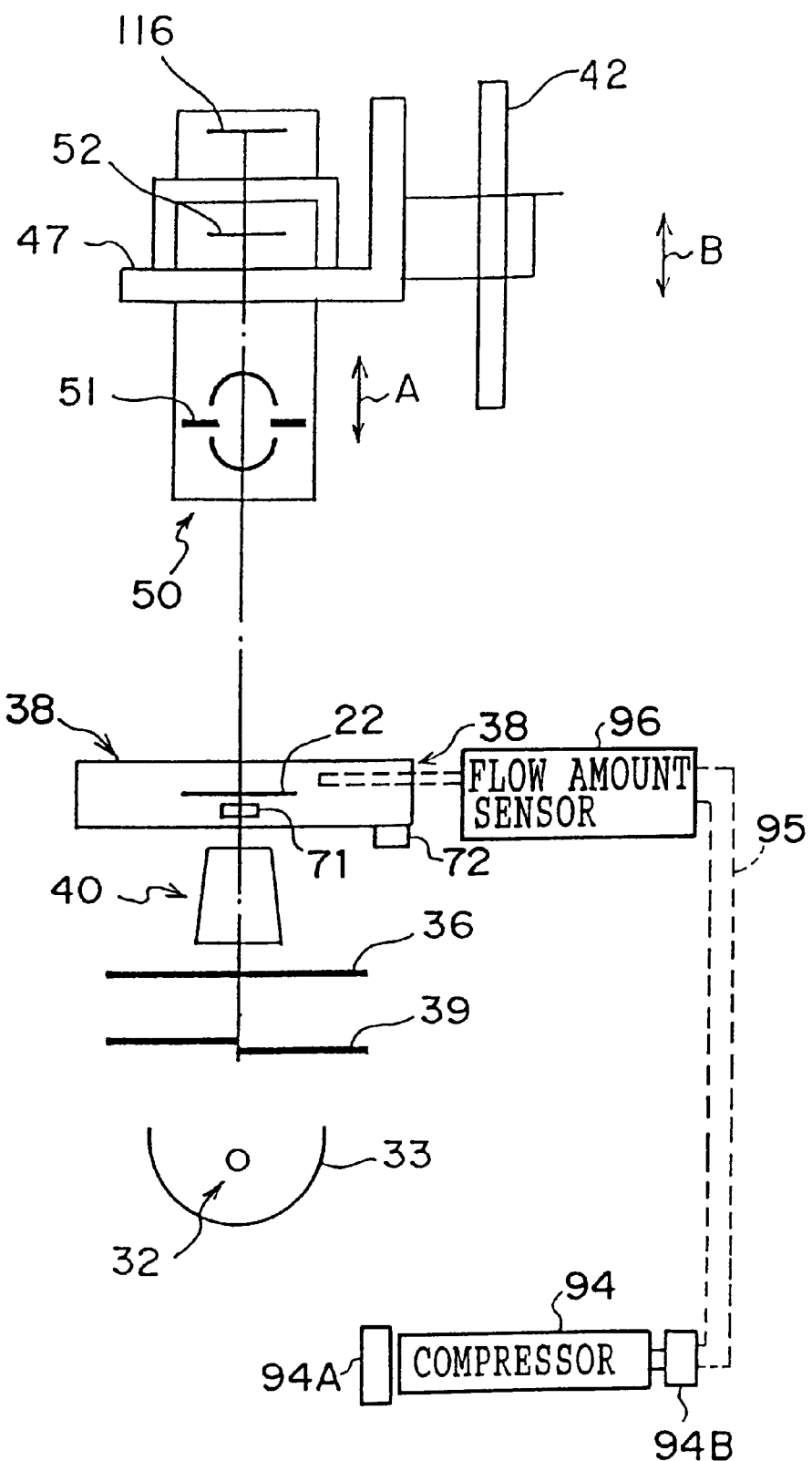
FIG. 16 is a plan view which shows only a principal portion of an optical system of a line CCD scanner when air filters are provided in the compressor shown in FIG. 14.

In this aspect, when the air filters 94A and 94B are provided at the compressor 94 as mentioned above, the compressor 94 can have a structure, for example, like that shown in FIG. 16.

Figure 17A:
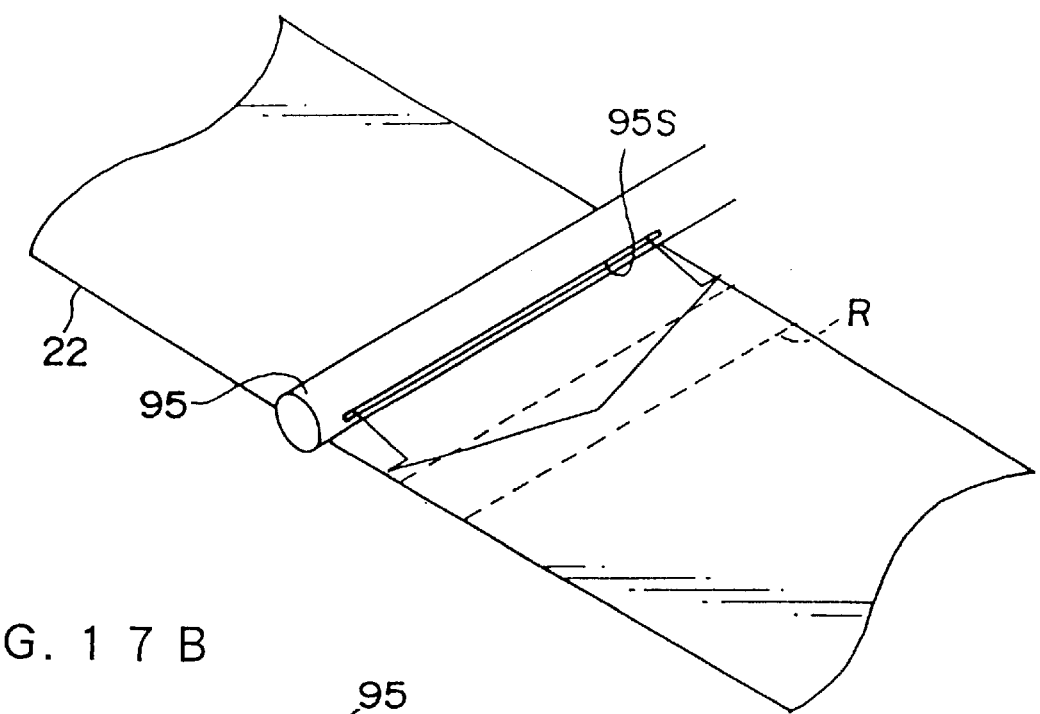
FIG. 17A is a perspective view which shows another example of a guide pipe.
Figure 17B:
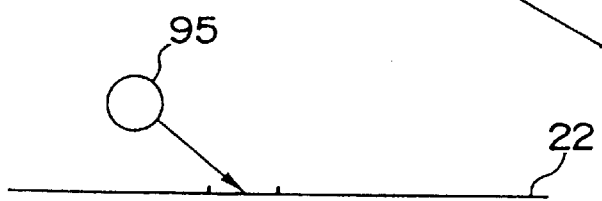
FIG. 17B is a cross-sectional view which shows the other example of the guide pipe.
Figure 17C:
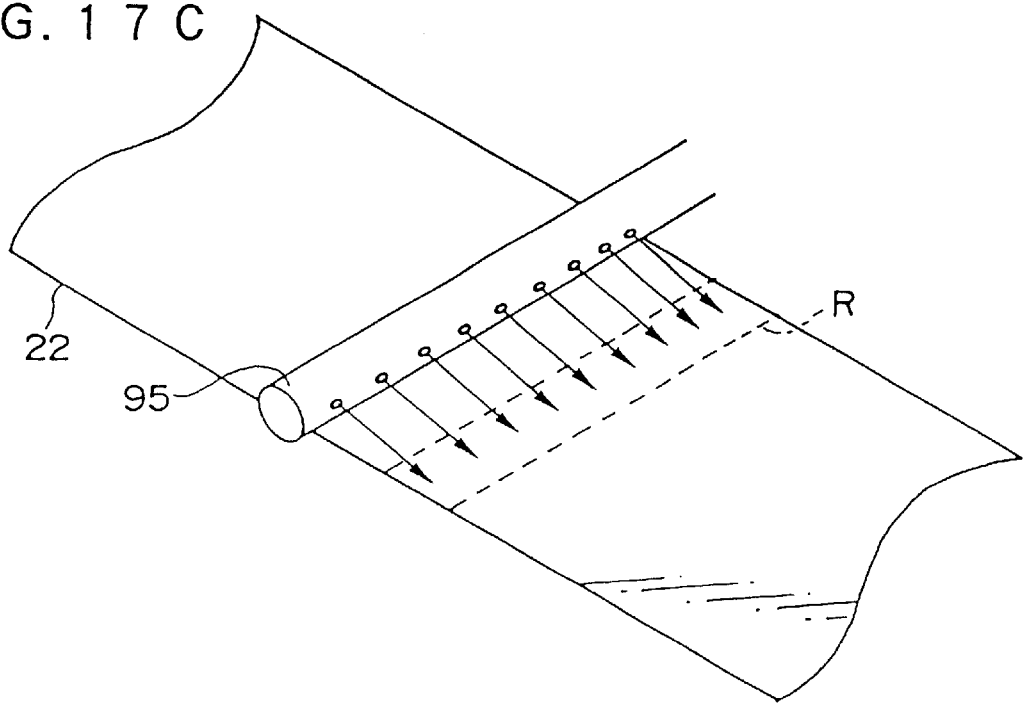
FIG. 17C is a perspective view which shows another variant example of a guide pipe.

Further, as shown in FIGS. 17A, 17B, and 17C, the guide pipe 95 may guide the cooling air so that the cooling air blows diagonally over the entire reading region R of the photographic film 22. Namely, the guide pipe 95 is disposed above the photographic film 22 in the direction perpendicular to the longitudinal direction of the photographic film 22, and a slit 95S which extends along the reading region R is provided at a portion of the guide pipe 95 which corresponds to the reading region R. Thus, the cooling air blows diagonally over the entire reading region R of the photographic film 22 via the slit 95S. Instead of the slit 95S, as shown in FIG. 17C, a plurality of holes may be provided in a row at a portion of the guide pipe 95 which corresponds to the reading region R.

Figure 18:
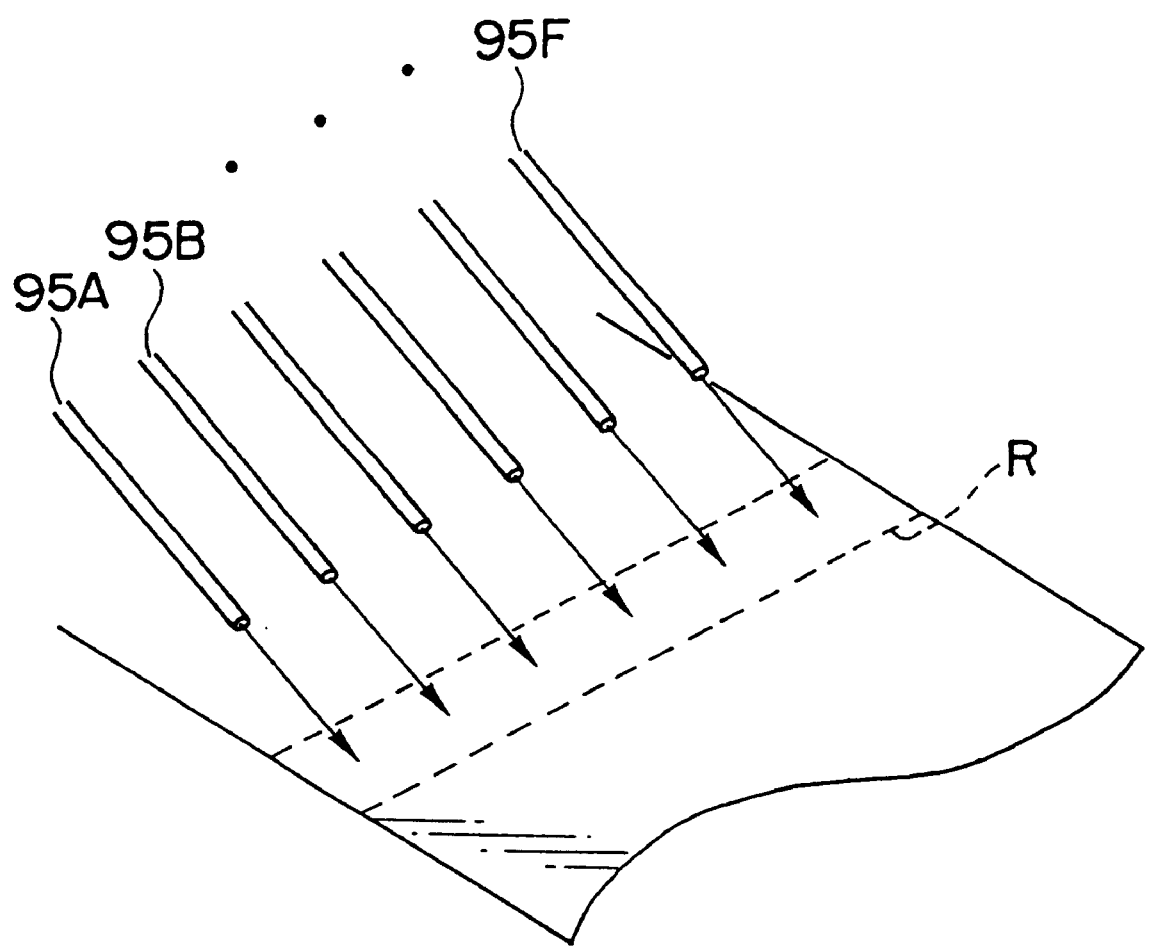
FIG. 18 is a perspective view which shows still another example of a guide pipe.

The slit 95S is provided at the portion of the guide pipe 95 which corresponds to the reading region R. However, the present invention is not limited to this and, as shown in FIG. 18, a plurality of pipes 95A, 95B, ... may be provided above the photographic film 22 so that the distal ends of the pipes 95A, 95B, ... are directed to the reading region R. Instead of the plurality of pipes 95A, 95B, ..., one pipe may be spaced apart by a predetermined distance so that the cooling air from the pipe blows the entire reading region R.

In the aforementioned embodiment, the flow amount sensor 96 is provided. However, the present invention is not limited to this and a sensor which detects the velocity of the cooling air or a sensor which detects the pressure thereof may be provided.

The compressor 94 is used in the aforementioned embodiment. However, the present invention is not limited to this and the cooling air generated by a fan may be used at the time of the temperature control.

The cooling air is blown directly to the photographic film 22 in the aforementioned embodiment. However, the present invention is not limited to this. The photographic film 22 may be nipped by a pair of transparent supporting plates (e.g., glass plates) and cooled via the supporting plates.

The cooling air is blown to the photographic film 22. It is more effective if a ventilating passage, which effectively guides and blows the cooling air without resistance to the illuminated region, is provided at the film carrier 38.

Figure 4B:
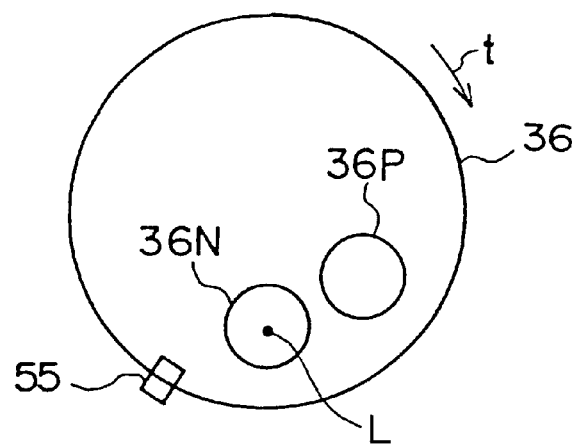
FIG. 4B is a plan view which shows an example of a turret.
Figure 4C:
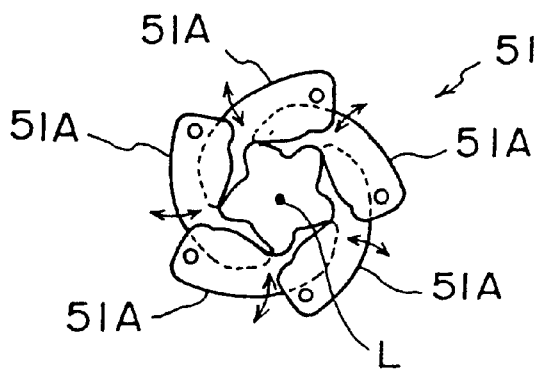
FIG. 4C is a plan view which shows an example of a lens aperture.
Figure 4D:
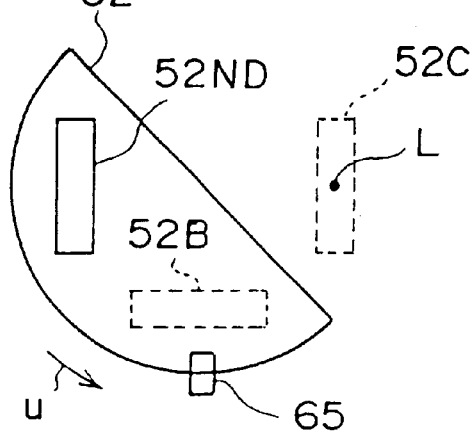
FIG. 4D is a plan view which shows an example of a CCD shutter.
Figure 19:
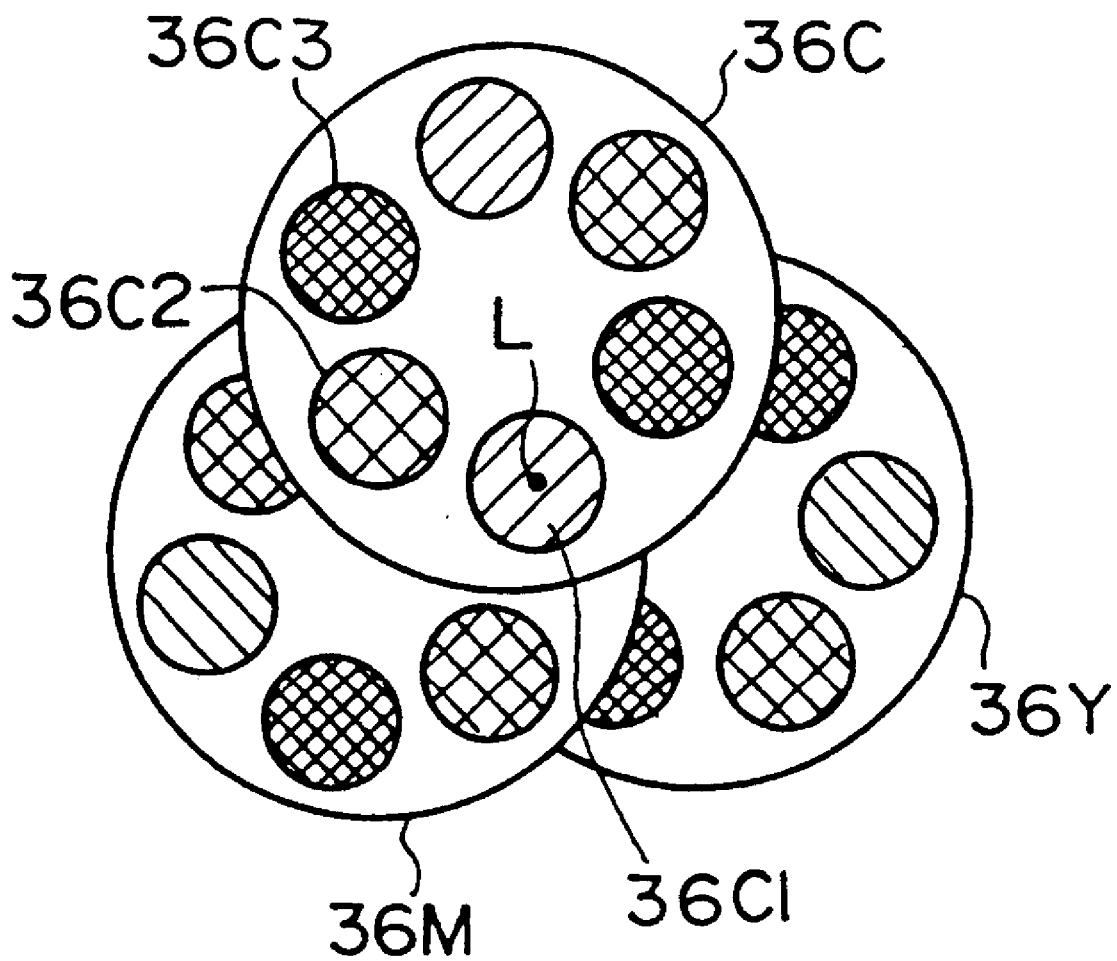
FIG. 19 is a plan view which shows a variant example of a turret.

The balance filters described above are fit into the one turret (see turret in FIG. 4B). The present invention is not limited to this. As shown in FIG. 19, the balance filters may be fit into a turret 36C for cyan filters which absorb red light, a turret 36M for magenta filters which absorb green light, a turret 36Y for yellow filters which absorb violet light. A plurality of cyan filters 36C1, 36C2, and 36C3 with different densities are fit into the turret 36C. The cyan filters 36C1, 36C2, 36C3 are darker in that order. The other turrets 36M and 36Y also have the similar structures. The turrets 36C, 36M, and 36Y are supported rotatably so that the filters selected by the turrets 36C, 36M, and 36Y are superposed on the optical axis L.

The present invention is also applicable to a device in which slit-shaped illuminating light is supplied to photographic film images, e.g., a slit exposure-typed photographic exposure device.

FIG. 20 shows a structural example of a principal portion in an optical system of this type of photographic exposure device. As shown in FIG. 20, a photographic exposure device 200 has substantially the same structure as that of the line CCD scanner 14 relating to the above embodiment shown in FIG. 5. However, the device 200 is different from the line CCD scanner 14 in that the CCD shutter 52 is not provided and that a mirror 202 which guides light from the photographic film 22 is provided so that the light from the photographic film 22 is irradiated onto a photographic printing paper 204. The photographic exposure device 200 corresponds to the image recording apparatus of the present invention, the mirror 202 corresponds to the guide means of the present invention, and the photographic printing paper 204 corresponds to the photosensitive material for recording of the present invention.

In this photographic exposure device 200, slit light from the photographic film 22 is guided to the photographic printing paper 204 by the mirror 202 and slit exposure is effected while the photographic film 22 and the photographic printing paper 204 are relatively moved.

The present invention is also applicable to such an analog printer. In this case as well, it goes without saying that the aforementioned various embodiments can be used.

What is claimed is:

1. An image reading apparatus, comprising:
   a conveying device which conveys a photosensitive material;
   an illuminator which irradiates light onto the photosensitive material conveyed by said conveying device;
   a reading device which receives light from the photosensitive material while the photosensitive material is being conveyed by said conveying device;
   a cooling device which cools at least one of a region of the photosensitive material, onto which the light is irradiated, and a reverse surface of the region;
   a controller which, when a condition for starting cooling is formed, operates said cooling device and which, when a condition for reducing cooling capacity is formed, reduces a cooling capacity of said cooling device;
   wherein the condition for starting cooling is the condition formed when the light is able to be read by said reading device, and the condition for reducing cooling capacity is the condition formed when the light is unable to be read by said reading device.

2. An image reading apparatus, comprising:
   a conveying device which conveys a photosensitive material;
   an illuminator which irradiates light onto the photosensitive material conveyed by said conveying device;
   a reading device which receives light from the photosensitive material while the photosensitive material is being conveyed by said conveying device;
   a cooling device which cools at least one of a region of the photosensitive material, onto which the light is irradiated, and a reverse surface of the region;
   a controller which, when a condition for starting cooling is formed, operates said cooling device and which, when a condition for reducing cooling capacity is formed, reduces a cooling capacity of said cooling device;
   wherein an image having predetermined density or higher is recorded onto the photosensitive material, and the condition for starting cooling is the condition formed when the light from the image having a predetermined density or higher can be read by said reading device, and the condition for reducing cooling capacity is the condition formed when the light from the image having a predetermined density or lower can be read by said reading device.

3. An image reading apparat us according to claim 2, wherein said controller controls said cooling device in accordance with the density of the image read by said reading device so that the cooling device operates at larger capacity as the density becomes higher.

4. An image reading apparatus according to claim 2, wherein said conveying device conveys the photosensitive material at slower speed as the density of the image read by said reading device is larger, and said controller controls said cooling device in accordance with the conveying speed of said conveying device so that said cooling device operates at larger capacity as the conveying speed becomes slower.

5. An image reading apparatus, comprising:
   a conveying device which conveys a photosensitive material;
   an illuminator which irradiates light onto the photosensitive material conveyed by said conveying device;
   a reading device which receives light from the photosensitive material while the photosensitive material is being conveyed by said conveying device;
   a cooling device which cools at least one of a region of the photosensitive material, onto which the light is irradiated, and a reverse surface of the region;
   a controller which, when a condition for starting cooling is formed, operates said cooling device and which, when a condition for reducing cooling capacity is formed, reduces a cooling capacity of said cooling device;
   a detector which detects whether the photosensitive material exists in the region onto which the light is irradiated by said illuminator, wherein
      the condition for starting cooling is the condition formed when it is detected by said detector that the photosensitive material exists in the region, and the condition for reducing cooling capacity is the condition formed when it is detected by said detector that the photosensitive material does not exist in the region.

6. An image reading apparatus according to claim 5, wherein said conveying device is loaded so as to be attachable and removable, and said detector detects the existence of the photosensitive material in the region by detecting whether said conveying device is loaded.

7. An image reading apparatus, comprising:
   a conveying device which conveys a photosensitive material;
   an illuminator which irradiates light onto the photosensitive material conveyed by said conveying device;

a reading device which receives light from the photosensitive material while the photosensitive material is being conveyed by said conveying device;

a cooling device which cools at least one of a region of the photosensitive material, onto which the light is irradiated, and a reverse surface of the region;

a controller which, when a condition for starting cooling is formed, operates said cooling device and which, when a condition for reducing cooling capacity is formed, reduces a cooling capacity of said cooling device;

an aperture which stops the amount of light irradiated onto the photosensitive material; and a stopped state detector which detects whether a state stopped by said aperture is a dangerous state in which the quality of the photosensitive material is deteriorated by the irradiation of the stopped amount of light, wherein the condition for starting cooling is the condition formed when it is detected by said stopped state detector that the stopped state is dangerous, and the condition for reducing cooling capacity is the condition formed when it is detected by said stopped state detector that the stopped state is safe.

8. An image reading apparatus comprising:

a conveying device which conveys a photosensitive material;

an illuminator which irradiates light onto the photosensitive material conveyed by said conveying device;

a reading device which receives light from the photosensitive material while the photosensitive material is being conveyed by said conveying device; and a cooling device which cools at least one of a region of the photosensitive material, onto which the light is irradiated, and a reverse surface of the region;

wherein said cooling device includes a cooling air generating device which generates cooling air for cooling the photosensitive material and a guide which guides the cooling air generated by said cooling air generating device to at least one of the region of the photosensitive material, onto which the light is irradiated, and the reverse surface of the region.

9. An image reading apparatus according to claim 8, wherein said cooling air generating device is a compressor.

10. An image reading apparatus according to claim 8, wherein said cooling air generating device is provided with an air filter.

11. An image reading apparatus comprising:

a conveying device which conveys a photosensitive material;

an illuminator which irradiates light onto the photosensitive material conveyed by said conveying device;

a reading device which receives light from the photosensitive material while the photosensitive material is being conveyed by said conveying device; and a cooling device which cools at least one of a region of the photosensitive material, onto which the light is irradiated, and a reverse surface of the region;

wherein said illuminator irradiates linear light, which extends in a direction intersecting a longitudinal direction of the photosensitive material, onto the photosensitive material, and said cooling device includes a cooling air generating device which generates cooling air for cooling the photosensitive material and a guide which guides the cooling air generated by said cooling air generating device to at least one of a portion of a region to be illuminated of the photosensitive material, onto which the linear light is irradiated, and the reverse surface of the region to be illuminated.

12. An image reading apparatus according to claim 11, wherein said guide guides the cooling air so that the cooling air flows along at least one of the portion of the region to be illuminated and the reverse surface of the region to be illuminated.

13. An image reading apparatus according to claim 11, wherein said guide guides the cooling air diagonally over at least one of the entire portion of the region to be illuminated and the reverse surface of the region to be illuminated.

* * * * *